(12) United States Patent
Hatta

(10) Patent No.: US 12,435,489 B2
(45) Date of Patent: Oct. 7, 2025

(54) LEVER DEVICE AND WORKING MACHINE INCLUDING THE SAME

(71) Applicant: KUBOTA CORPORATION, Osaka (JP)

(72) Inventor: Kazuyuki Hatta, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/975,128

(22) Filed: Dec. 10, 2024

(65) Prior Publication Data

US 2025/0101713 A1 Mar. 27, 2025

Related U.S. Application Data

(63) Continuation of application No. PCT/JP2023/022352, filed on Jun. 16, 2023.

(30) Foreign Application Priority Data

Jun. 30, 2022 (JP) ................................. 2022-105781

(51) Int. Cl.
*E02F 9/20* (2006.01)
*G05G 1/04* (2006.01)
(Continued)

(52) U.S. Cl.
CPC .............. *E02F 9/2004* (2013.01); *E02F 9/20* (2013.01); *G05G 1/04* (2013.01); *G05G 5/06* (2013.01); *E02F 9/2271* (2013.01)

(58) Field of Classification Search
CPC ............. E02F 9/20; E02F 9/2004; E02F 9/16; E02F 9/2271; G05G 1/04; G05G 5/00; G05G 5/06
(Continued)

(56) References Cited

U.S. PATENT DOCUMENTS

2005/0210717 A1* 9/2005 Ueda ........................ E02F 9/163
37/443
2009/0243338 A1* 10/2009 Ueda ........................ E02F 9/163
296/190.01
(Continued)

FOREIGN PATENT DOCUMENTS

FR 2816727 A1 * 5/2002 ............... G05G 1/62
JP 2003099138 A * 4/2003
(Continued)

*Primary Examiner* — Keith J Frisby
(74) *Attorney, Agent, or Firm* — GREENBLUM & BERNSTEIN, P.L.C.

(57) ABSTRACT

A lever device includes a base, a movable body supported on the base rotatably about a first lateral shaft, a lever supported by the movable body and pivotable between a depressed position and a raised position, a cam body including a cam groove, the cam body being supported on the movable body rotatably about a second lateral shaft and configured to rotate about the second lateral shaft as the lever is pivoted, and first and second guide members attached to the base and inserted in the cam groove, the guide members being configured to change their position relative to the cam groove as the lever is pivoted. The cam groove includes a first groove portion where the first guide member is positioned when the lever is in the depressed position, and a second groove portion where the second guide member is positioned when the lever is in the depressed position.

15 Claims, 19 Drawing Sheets

(51) Int. Cl.
*G05G 5/06* (2006.01)
*E02F 9/22* (2006.01)

(58) Field of Classification Search
USPC .......................................... 180/315; 37/443
See application file for complete search history.

(56) References Cited

U.S. PATENT DOCUMENTS

2017/0285681 A1* 10/2017 Nishigori ............... G05G 5/005
2020/0299931 A1 9/2020 Nishigori et al.
2023/0287652 A1* 9/2023 Shiiguchi .............. E02F 9/0883

FOREIGN PATENT DOCUMENTS

| JP | 3985762 B2 | * | 10/2007 |
| JP | 2012127137 A | * | 7/2012 |
| JP | 2018091015 A | * | 6/2018 |
| JP | 2019052455 A | * | 4/2019 |
| JP | 2019-116753 A | | 7/2019 |

* cited by examiner

LEVER DEVICE AND WORKING MACHINE INCLUDING THE SAME

CROSS REFERENCE TO RELATED APPLICATIONS

This application is a continuation application of International Application No. PCT/JP2023/022352, filed on Jun. 16, 2023, which claims the benefit of priority to Japanese Patent Application No. 2022-105781, filed on Jun. 30, 2022. The entire contents of each of these applications are hereby incorporated herein by reference.

BACKGROUND OF THE INVENTION

1. Field of the Invention

The present invention relates to lever devices and work machines including a lever device.

BACKGROUND ART

A working machine which includes a lever device such as an unloading lever device is known as disclosed in Japanese Unexamined Patent Application Publication No. 2019-116753.

The lever device disclosed in the Japanese Unexamined Patent Application Publication No. 2019-116753 includes an unloading lever, a cam body to rotate as the unloading lever is pivoted, and a guide pin inserted in a cam groove in the cam body, and is configured such that, when the unloading lever is pivoted to move between the depressed position and to the raised position, the position of the guide pin inside the cam groove changes as the unloading lever is pivoted.

SUMMARY OF THE INVENTION

The lever device disclosed in the Japanese Unexamined Patent Application Publication No. 2019-116753 has a gap between the guide pin and the cam groove so that the position of the guide pin within the cam groove is changed (moved) smoothly. Thus, in the state where the unloading lever is in the depressed position (state where the lever device is in the use position), when another lever (operating lever) of the lever device is operated, rattling may occur due to the gap.

Example embodiments of the present invention provide lever devices to prevent or reduce rattling that may occur when, while the lever is in the depressed position, another lever is operated.

A lever device according to an aspect of an example embodiment of the present invention includes a base, a movable body pivotally supported on the base rotatably about a first lateral shaft, a lever supported by the movable body and pivotable between a depressed position and a raised position, a cam body including a cam groove, the cam body being pivotally supported on the movable body rotatably about a second lateral shaft and configured to rotate about the second lateral shaft as the lever is pivoted, and guide members attached to the base and inserted in the cam groove, the guide members being configured to change a position thereof relative to the cam groove as the lever is pivoted, wherein the guide members include a first guide member and a second guide member, and the cam groove includes a first groove portion in which the first guide member is positioned when the lever is in the depressed position, and a second groove portion in which the second guide member is positioned when the lever is in the depressed position.

The cam body may include a projecting portion projecting toward an interior of the cam groove to separate the first groove portion and the second groove portion. The projecting portion may be positioned between the first guide member and the second guide member when the lever is in the depressed position.

The lever device may be configured such that the first groove portion and the second groove portion are each configured such that a bottom thereof is positioned up and an opening thereof faces downward when the lever is in the depressed position, and the projecting portion projects downward when the lever is in the depressed position.

The cam groove may include a fourth groove portion where the first guide member is positioned when the lever is in the raised position, a fifth groove portion where the second guide member is positioned when the lever is in the raised position, and a third groove portion in communication with the first groove portion, the second groove portion, the fourth groove portion and the fifth groove portion. The first guide member and the second guide member may be configured to move through the third groove portion when the lever is pivoted between the depressed position and the raised position.

The first groove portion may include a first inner surface located on the same side of the first groove portion as the second groove portion, and a second inner surface located on the opposite side of the first groove portion from the second groove portion. The second groove portion may include a third inner surface located on the same side of the second groove portion as the first groove portion, and a fourth inner surface located on the opposite side of the second groove portion from the first groove portion. The first guide member may be configured to abut the first inner surface and be separate from the second inner surface when the first guide member is positioned in the first groove portion. The second guide member may be configured to abut the third inner surface and be separate from the fourth inner surface when the second guide member is positioned in the second groove portion.

The first inner surface may be in the shape of an arc centered on an axis of the second lateral shaft.

The lever device may be configured such that the third inner surface is linear and, when the lever is in the depressed position, an axis of the first lateral shaft is positioned on an extension of the third inner surface.

The guide members may include guide rollers each rotatable about an axis parallel to the second lateral shaft. The guide rollers may include a first guide roller defining the first guide member, and a second guide roller defining the second guide member.

The lever device may further include a first biasing member to bias the cam body in a direction that causes the cam body to rotate about the second lateral shaft. The cam groove may include an inner surface to be abutted by the first guide member when the lever is in the raised position. The first biasing member may be configured to impart a biasing force to cause the first guide member to abut the inner surface when the lever is in the raised position.

The cam groove may include an engagement portion to engage with the first guide member when a portion other than the lever is depressed when the lever is in the raised position.

The guide members may include guide rollers each rotatable about an axis parallel to the second lateral shaft. The guide rollers may include a first guide roller defining the first guide member, and a second guide roller defining the second guide member. The cam groove may include an engagement portion to engage with the first guide member when a portion other than the lever is depressed when the lever is in the raised position.

The cam body may include an inwardly projecting portion to project upward toward an interior of the cam groove when the lever is in the raised position. The engagement portion may include a portion of a surface of the inwardly projecting portion. When the engagement portion and the first guide roller abut each other, an axis of the first lateral shaft may be positioned on a tangent to an outer surface of the first guide roller that passes through the engagement portion.

The lever device may be configured such that pivoting of the lever in the raised position from the raised position to the depressed position allows the first guide member to be disengaged from the engagement portion and allows the movable body to rotate about the first lateral shaft.

A working machine may include the lever device.

The working machine may include an operator's seat, a hydraulic actuator, and the lever device provided at one side of the operator's seat. The lever may include an unloading lever to switch the hydraulic actuator between an operable state and a non-operable state.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
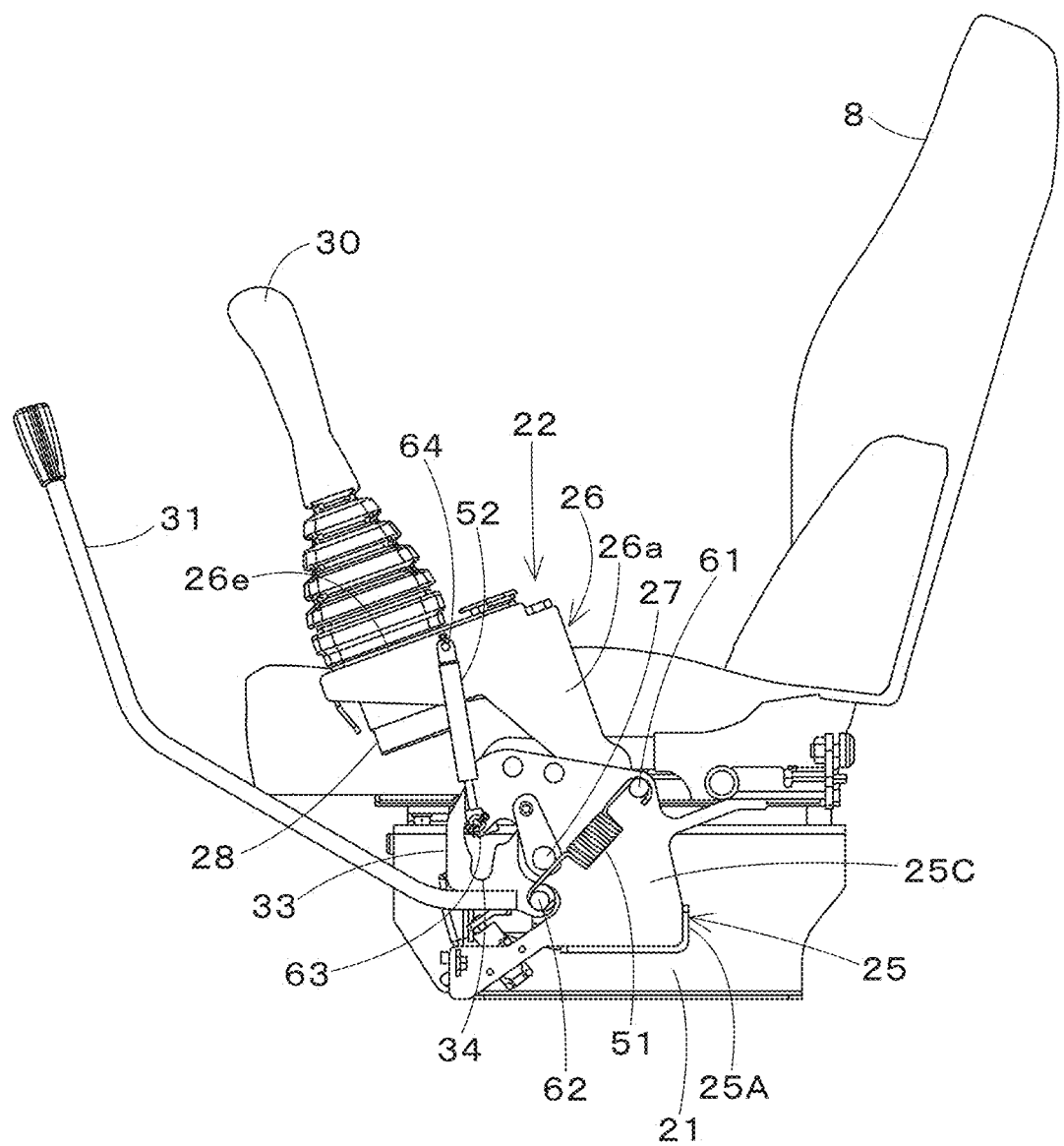
FIG. 1 is a side view of an operator's seat and a lever device (left manipulator) as seen from the left.

Example embodiments will now be described with reference to the accompanying drawings, wherein like reference numerals designate corresponding or identical elements throughout the various drawings. The drawings are to be viewed in an orientation in which the reference numerals are viewed correctly.

The following description discusses example embodiments of the present invention with reference to the drawings.

Figure 18:
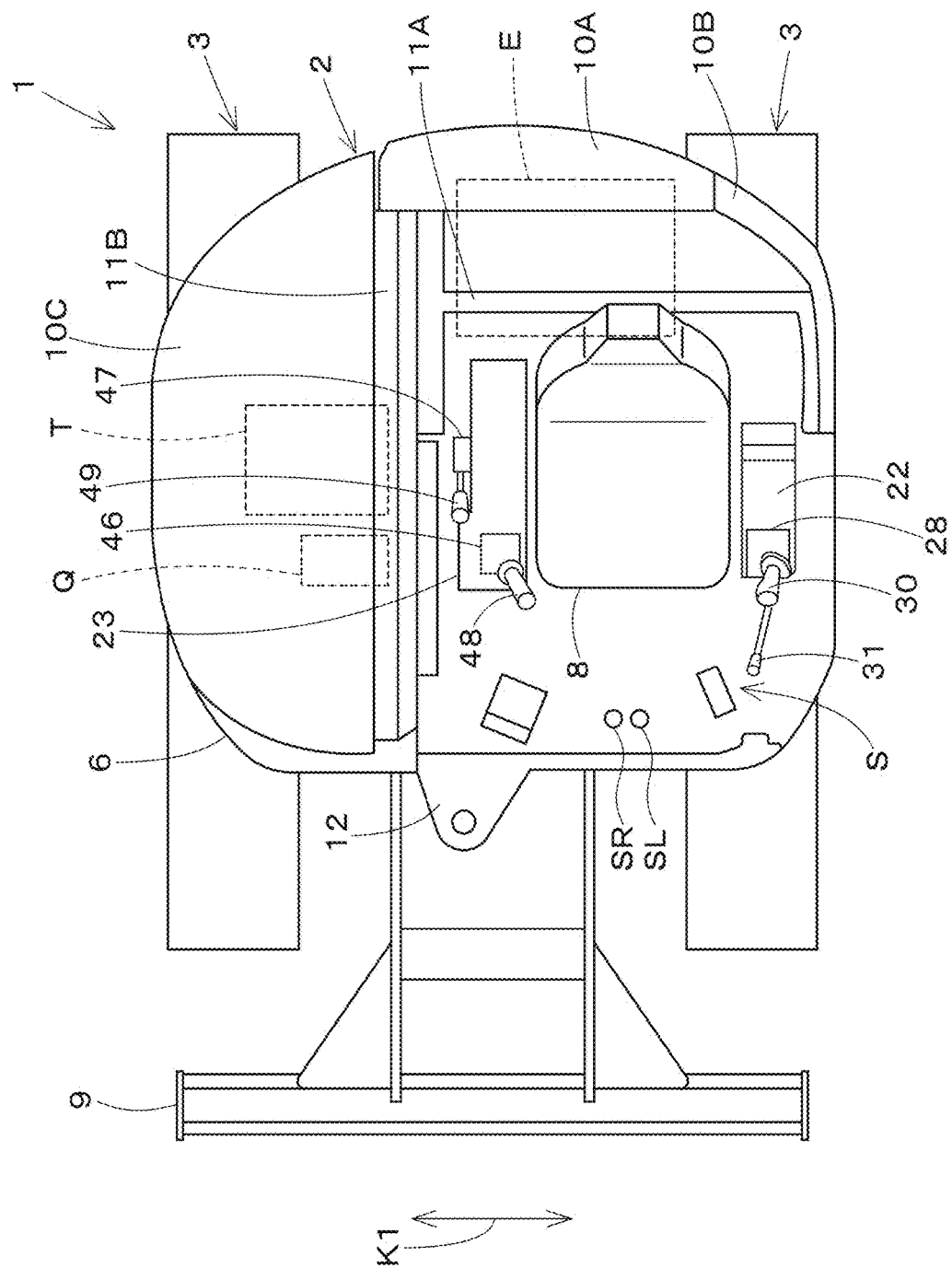
FIG. 18 is a plan view of a working machine.
Figure 19:
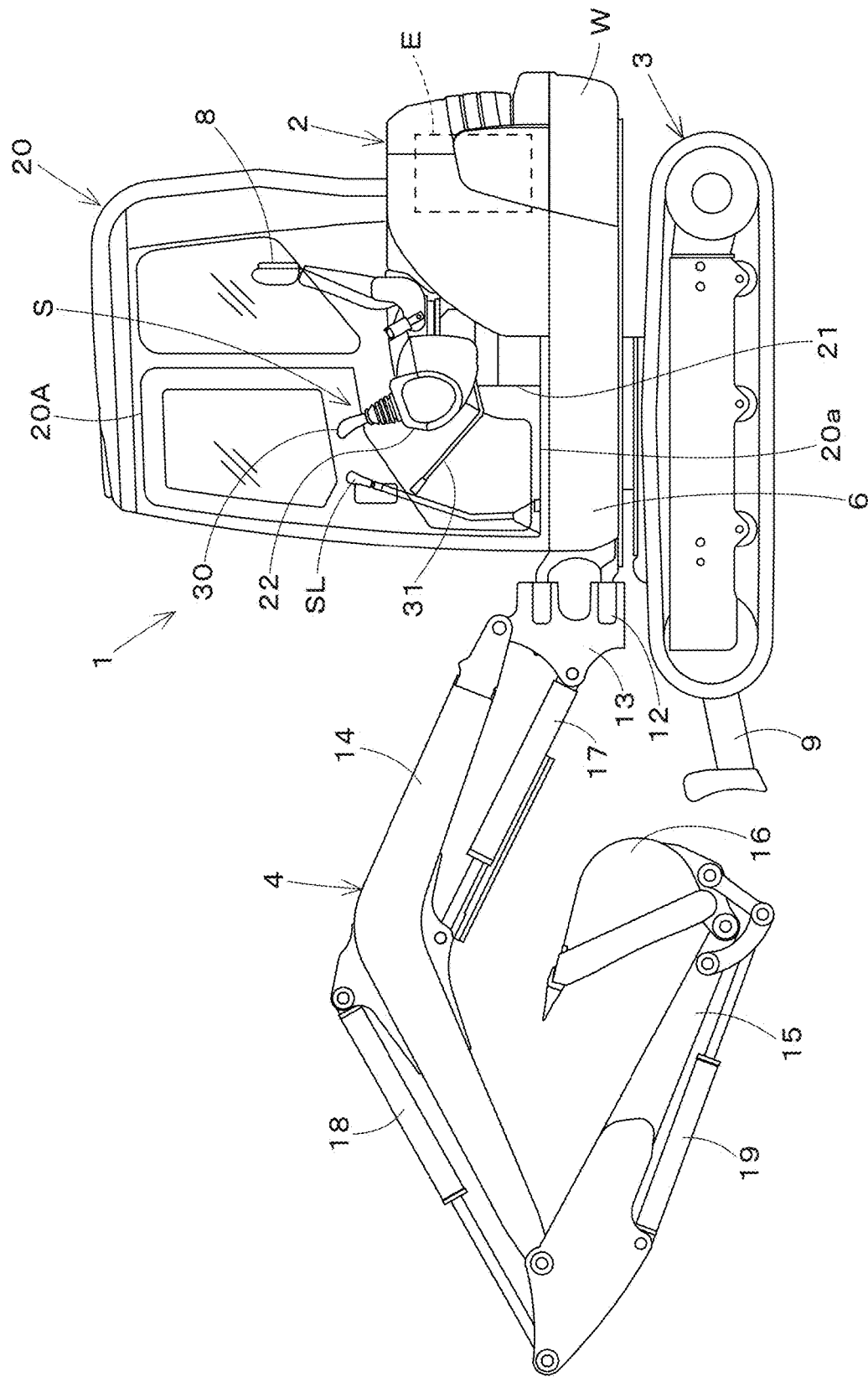
FIG. 19 is a side view of a working machine.

FIGS. 18 and 19 show a working machine 1 according to the present example embodiment. In the present example embodiment, a backhoe, which is a swiveling working machine, is illustrated as the working machine 1.

The working machine 1 includes a machine body (vehicle body) 2, traveling device(s) 3, and a working device 4.

An operator's seat 8 is provided on the machine body 2. A forward direction from an operator seated on the operator's seat 8 (left side in FIG. 19) is hereinafter referred to as forward, a rearward direction from the operator (right side in FIG. 19) is hereinafter referred to as rearward, a leftward direction from the operator (a downward direction in FIG. 18, a direction toward the near side in FIG. 19) is hereinafter referred to as leftward, and a rightward direction from the operator (an upward direction in FIG. 18, a direction toward the far side in FIG. 19) is hereinafter referred to as rightward. A horizontal direction K1 (see FIG. 18) perpendicular to the front-rear direction is hereinafter referred to as a machine body width direction.

The machine body 2 includes a swivel base 6 supported on a frame of the traveling device(s) 3. The swivel base 6 is supported above the traveling device(s) 3 such that the swivel base 6 is rotatable about an axis in the up-down direction via a bearing by the drive force of a swivel motor (not illustrated). As shown in FIG. 19, a working device 4 is attached to a front portion of the swivel base 6. A cabin 20 is provided on the swivel base 6. Note that the working device 4 and the cabin 20 are not illustrated in FIG. 18. The operator's seat 8 is provided inside the cabin 20. An entrance/exit 20a is provided leftward of the operator's seat 8 at a left portion of the cabin 20. The entrance/exit 20a is provided with a door 20A.

An engine room is provided on the swivel base 6 at a rear portion. The engine room contains therein an engine E, hydraulic pump(s) (not illustrated), and the like. The front of the engine room is separated from the operator's seat 8 by a partition wall 11A. The rear of the engine room is covered by a rear hood 10A. The left side of the engine room is covered by a left cover body 10B.

A tank room is provided on the swivel base 6 at a right portion. The tank room contains therein a hydraulic fluid tank T, a control valve Q, and the like. The left side of the tank room is separated from the operator's seat 8 by a partition wall 11B. The top, the front and the right side of the tank room are covered by a right cover body 10C.

Note, however, that in the working machine 1 according to the present invention, the positions and shapes of devices and cover bodies provided on the swivel base 6 are not limited to those described above and illustrated in the drawings.

As shown in FIG. 19, the working device 4 is attached to the front portion of the swivel base 6 via a mounting bracket 12 and a swing bracket 13. The mounting bracket 12 is fixed to the front portion of the swivel base 6. The swing bracket 13 is supported by the mounting bracket 12 such that the swing bracket 13 is swingable about an axis in the up-down direction. The swing bracket 13 is caused to swing leftward and rightward by a hydraulic swing cylinder. The swivel base 6 has, attached to a rear portion thereof, a counterweight W to make a weight balance with the working device 4.

The traveling devices 3 are crawler traveling devices provided on the right side and the left side of the machine body 2, respectively, below the machine body 2. The traveling devices 3 are each driven by a hydraulic travel motor. The traveling devices 3 are provided, at a front portion thereof, with a dozer 9. The dozer 9 is caused to swing up and down by a dozer cylinder which includes a hydraulic cylinder.

The working device 4 includes a boom 14, an arm 15, and a working tool 16. The working device 4 includes a boom cylinder 17, an arm cylinder 18, and a working tool cylinder 19 as drive mechanism(s) (hydraulic actuators) for the boom 14 and the like. The boom cylinder 17, the arm cylinder 18, and the working tool cylinder 19 each include a double-acting hydraulic cylinder.

The boom 14 is supported on the swing bracket 13 such that the boom 14 is swingable in the up-down direction. The arm 15 includes a proximal portion supported on a distal portion of the boom 14 such that the arm 15 is swingable in the up-down direction. A bucket, which is the working tool 16, is attached to a distal portion of the arm 15 such that the bucket is capable of shoveling and dumping.

A manipulator section S is provided on the swivel base 6. As shown in FIG. 18, the manipulator section S is separated from the engine room by the partition wall 11A, and separated from the tank room by the partition wall 11B. The operator's seat 8 is provided in the manipulator section S. A left travel operation lever SL and a right travel operation lever SR are provided in front of the operator's seat 8. By operating the left travel operation lever SL and the right travel operation lever SR, it is possible to independently or concurrently control the left and right traveling devices 3. Pedal(s) and the like are provided at positions corresponding to left and right feet near the bottom of the operator's seat 8.

As shown in FIG. 18, a left manipulator 22 and a right manipulator 23 are provided at opposite sides of the operator's seat 8. The left manipulator 22 is provided leftward of the operator's seat 8. The right manipulator 23 is provided rightward of the operator's seat 8. The left manipulator 22 and the right manipulator 23 are supported by a manipulator base 21 (see FIGS. 1 and 19) provided below the operator's seat 8.

As shown in FIG. 18, the right manipulator 23 includes a right manipulator valve 46 and a dozer controlling valve 47.

The right manipulator valve 46 can be operated using a right operating lever 48. The dozer controlling valve 47 can be operated using a dozer operating lever 49. The right manipulator valve 46 is a pilot valve for the boom 14 and the working tool 16. It is possible to control control valve(s) for the boom cylinder 17 and the working tool cylinder 19 by operating the right operating lever 48. The dozer controlling valve 47 is a pilot valve to drive the dozer 9. It is possible to control control valve(s) for the dozer cylinder by operating the dozer operating lever 49.

Note, however, that the configuration of the right manipulator 23 is not limited to the above described configuration. For example, the right manipulator 23 may be, for example, a joystick manipulator to output electric signals according to the operation of the right operating lever 48 or the dozer operating lever 49. In such a case, the right manipulator 23 includes a first detector 46 to detect the operation amount and the operation direction of the right operating lever 48, instead of the right manipulator valve 46. The first detector 46 outputs electrical signals to control the control valve(s) (solenoid valve(s)) for the boom cylinder 17 and the working tool cylinder 19 according to the operation amount and the operation direction of the right operating lever 48. Furthermore, the right manipulator 23 includes a second detector 47 to detect the operation amount and the operation direction of the dozer operating lever 49, instead of the dozer controlling valve 47. The second detector 47 outputs electrical signals to control the control valve(s) (solenoid valve(s)) for the dozer cylinder according to the operation amount and the operation direction of the dozer operating lever 49.

FIG. 1 shows the left manipulator 22. FIGS. 2, 3, 4 and 14 show a main portion of the left manipulator 22. The left manipulator 22 includes a lever 31, a movable body 26, and a cam body 33.

The left manipulator 22 is a lever device according to the present example embodiment. Specifically, in the present example embodiment, the lever 31 includes an unloading lever to switch hydraulic actuator(s) of the working machine 1 between an operable state and a non-operable state, and the lever device includes an unloading lever device including the unloading lever. Thus, the following description is based on the assumption that the lever device is an unloading lever device and that the lever 31 is an unloading lever. Note, however, that, the lever device is not limited to an unloading lever device, and the lever 31 is not limited to an unloading lever.

Figure 14:
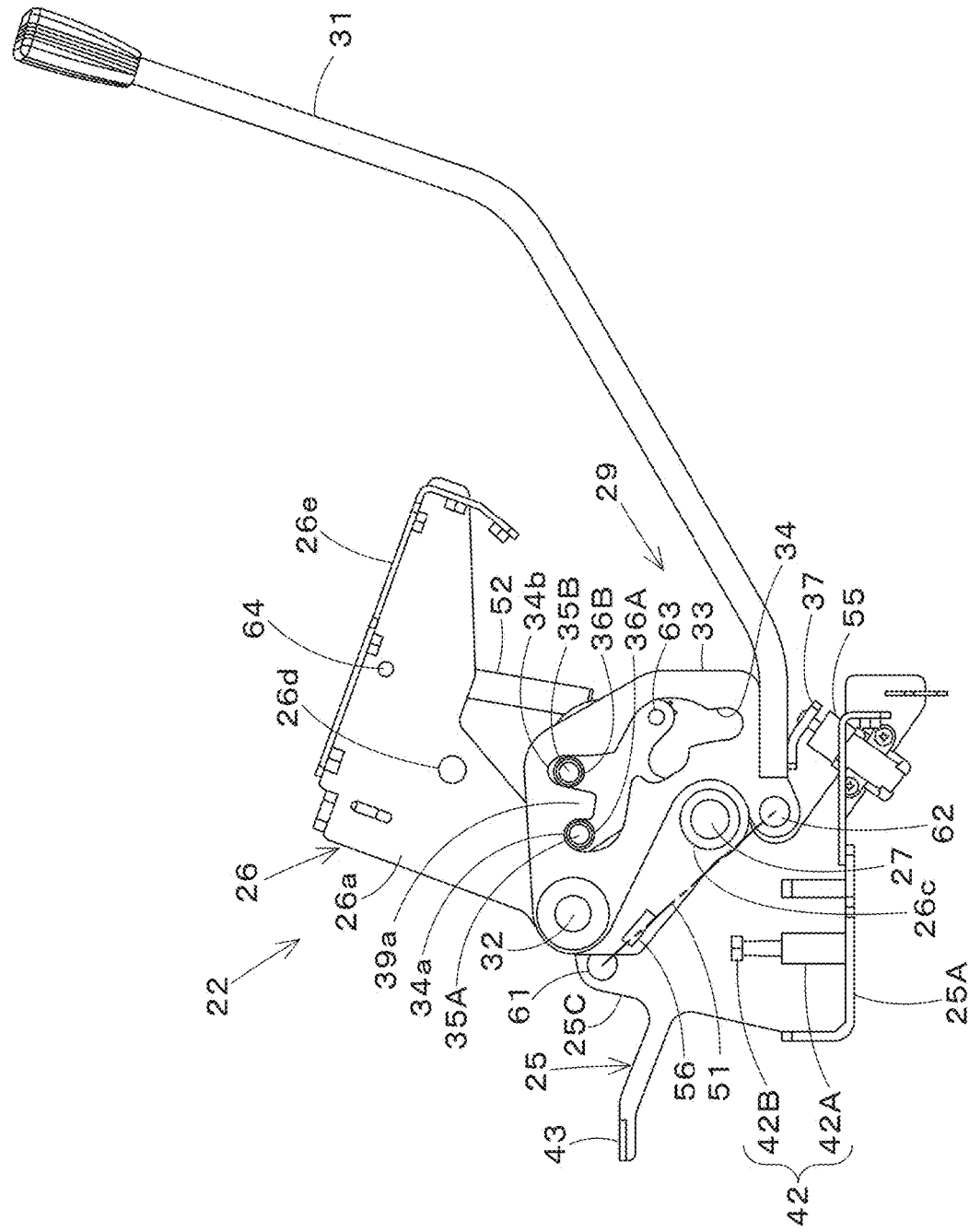
FIG. 14 is a right side view of a lever device with an unloading lever in the depressed position.
Figure 17:
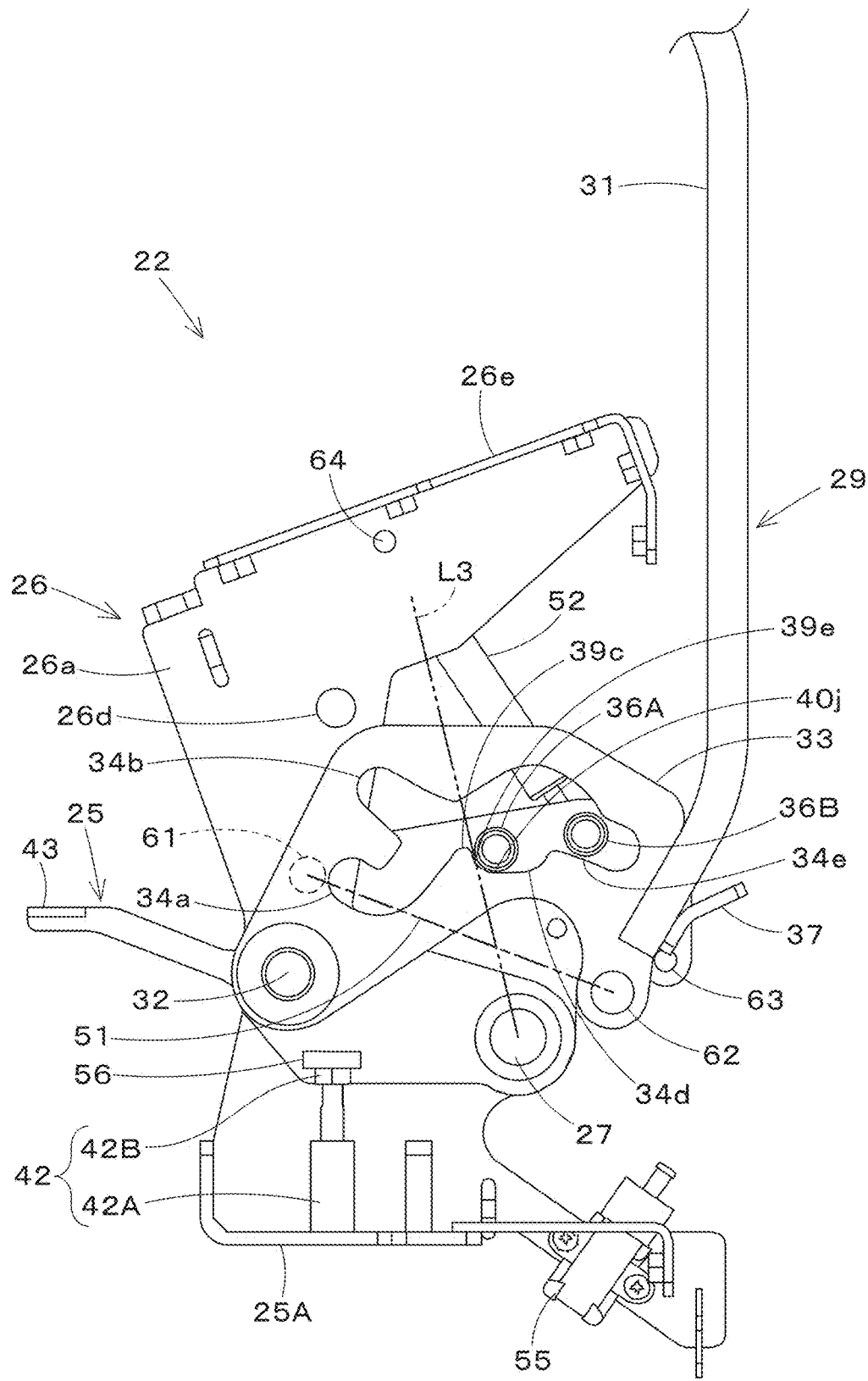
FIG. 17 is a right side view of a lever device with an unloading lever in the raised position.

The unloading lever 31 is pivotable between a depressed position as shown in FIG. 14 and a raised position as shown in FIG. 17. When the unloading lever 31 is in the depressed position (see FIG. 14), hydraulic actuator(s) is/are in an operable state. When the unloading lever 31 is in the raised position (see FIG. 17), hydraulic actuator(s) is/are in a non-operable state.

The movable body 26 is pivotally supported on a base 25 such that the movable body 26 is rotatable about an axis in the machine body width direction. In the present example embodiment, the movable body 26 is a manipulator box, and the base 25 is a support bracket. Thus, the following description is based on the assumption that the movable body 26 is a manipulator box, and that the base 25 is a support bracket. Note, however, that the movable body 26 is not limited to a manipulator box, and the base 25 is not limited to a support bracket.

Figure 5:
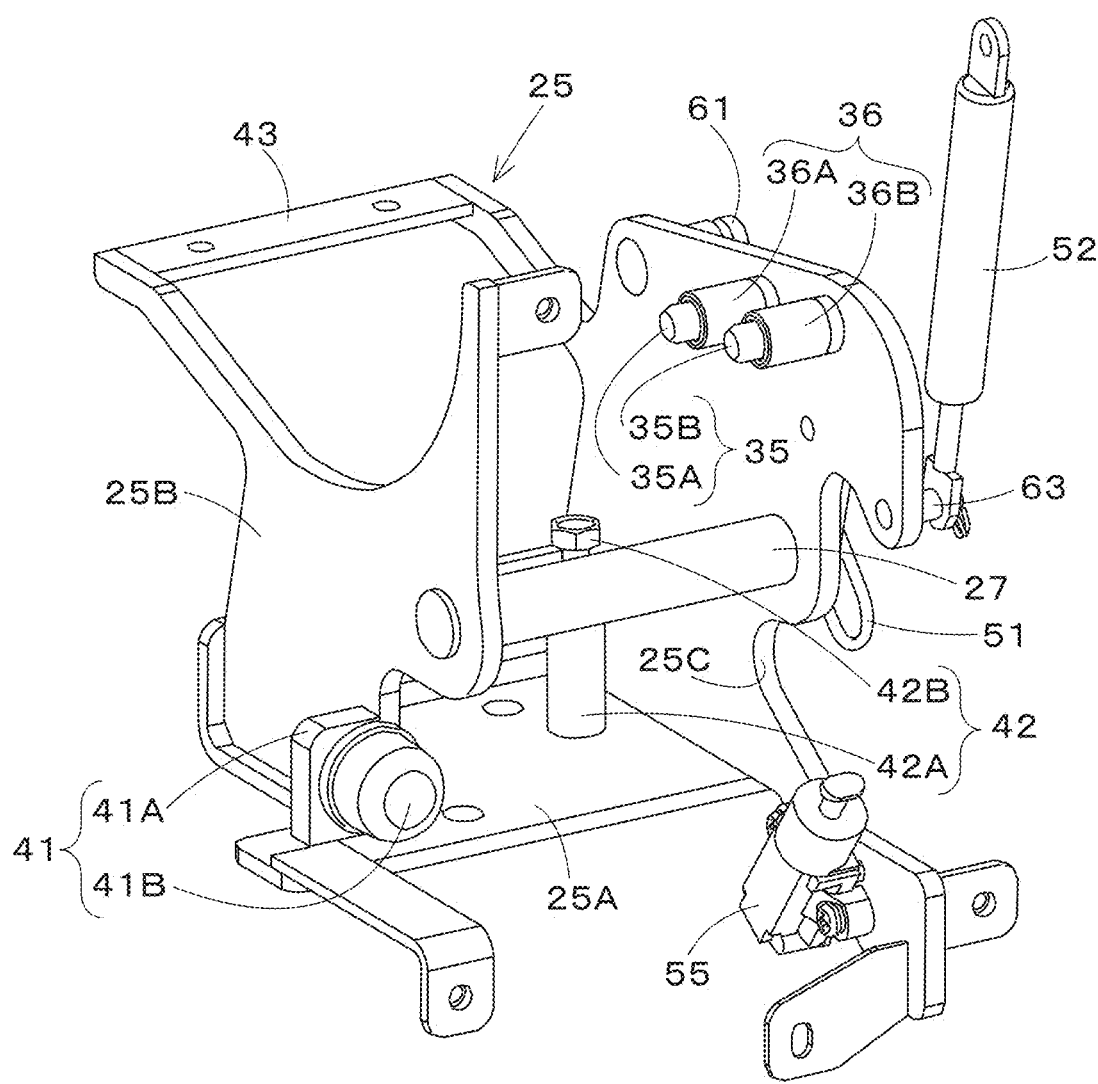
FIG. 5 is a perspective view of a base (support bracket) as seen from the front right.
Figure 6:
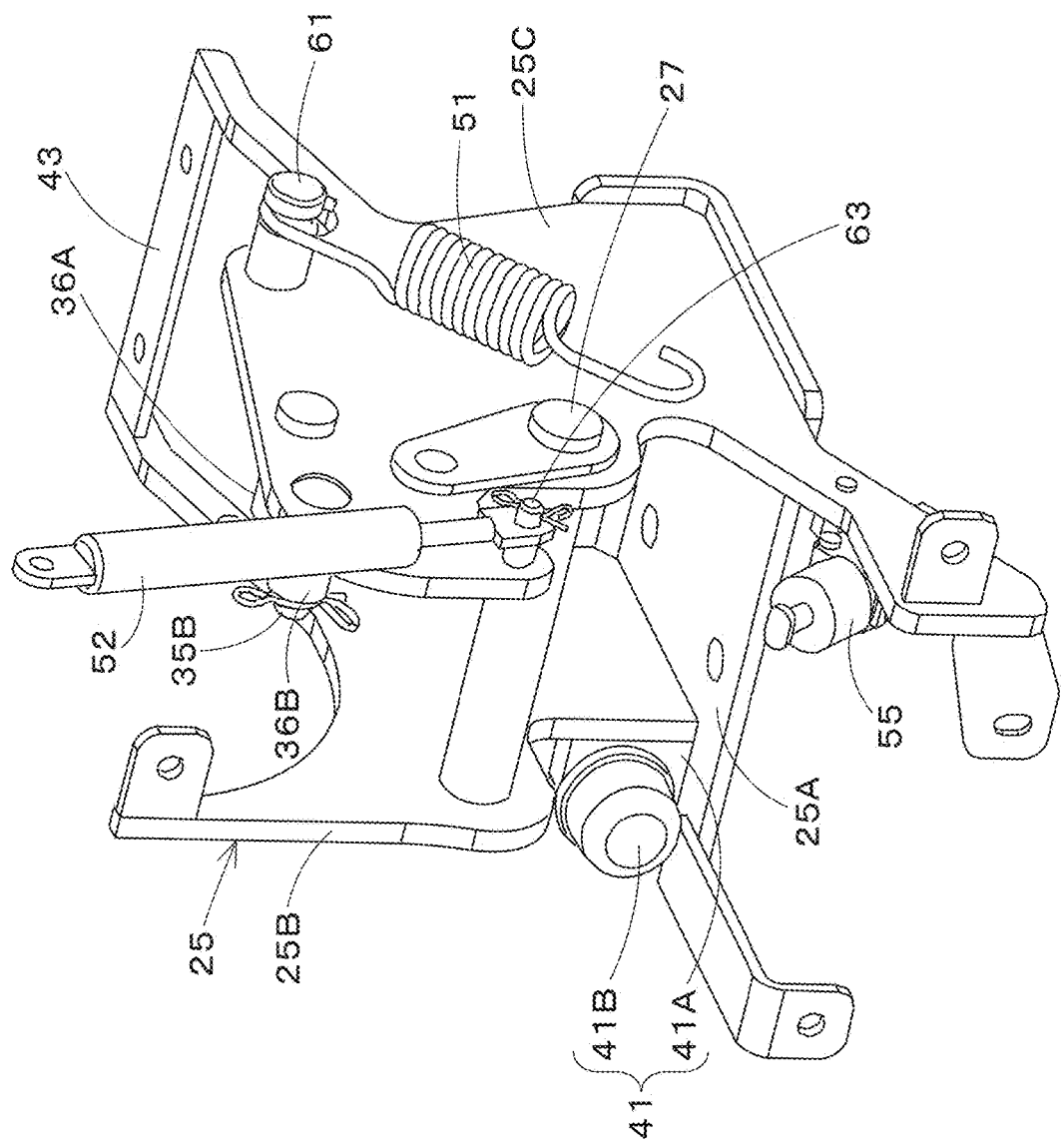
FIG. 6 is a perspective view of a base (support bracket) as seen from the front left.

FIGS. 5 and 6 show the support bracket (base) 25 rotatably supporting the movable body 26. The support bracket 25 includes an attachment portion 25A in the form of a plate provided horizontally, and a first support portion 25B and a second support portion 25C each of which extends upright from an upper surface of the attachment portion 25A. The attachment portion 25A is attached to the manipulator base 21 (see FIG. 1) using bolt(s) and/or the like. The attachment portion 25A may be directly attached to the manipulator base 21 or indirectly attached to the manipulator base 21 via other component(s).

The first support portion 25B and the second support portion 25C are each in the form of a flat plate and are arranged in the machine body width direction with a space between them. The first support portion 25B is located inward of the second support portion 25C (closer to the operator's seat 8 than the second support portion 25C is) along the machine body width direction, and defines a right wall of the support bracket 25. The second support portion 25C is located outward of the first support portion 25B (located at the opposite side of the first support portion 25B from the operator's seat 8) along the machine body width direction, and defines a left wall of the support bracket 25. The first support portion 25B and the second support portion 25C are connected to each other by a first lateral shaft 27 extending in the machine body width direction. The first lateral shaft 27 connects a front portion of the first support portion 25B and a front portion of the second support portion 25C. A rear portion of the first support portion 25B and a rear portion of the second support portion 25C are connected by a connection member 43.

Figure 7:
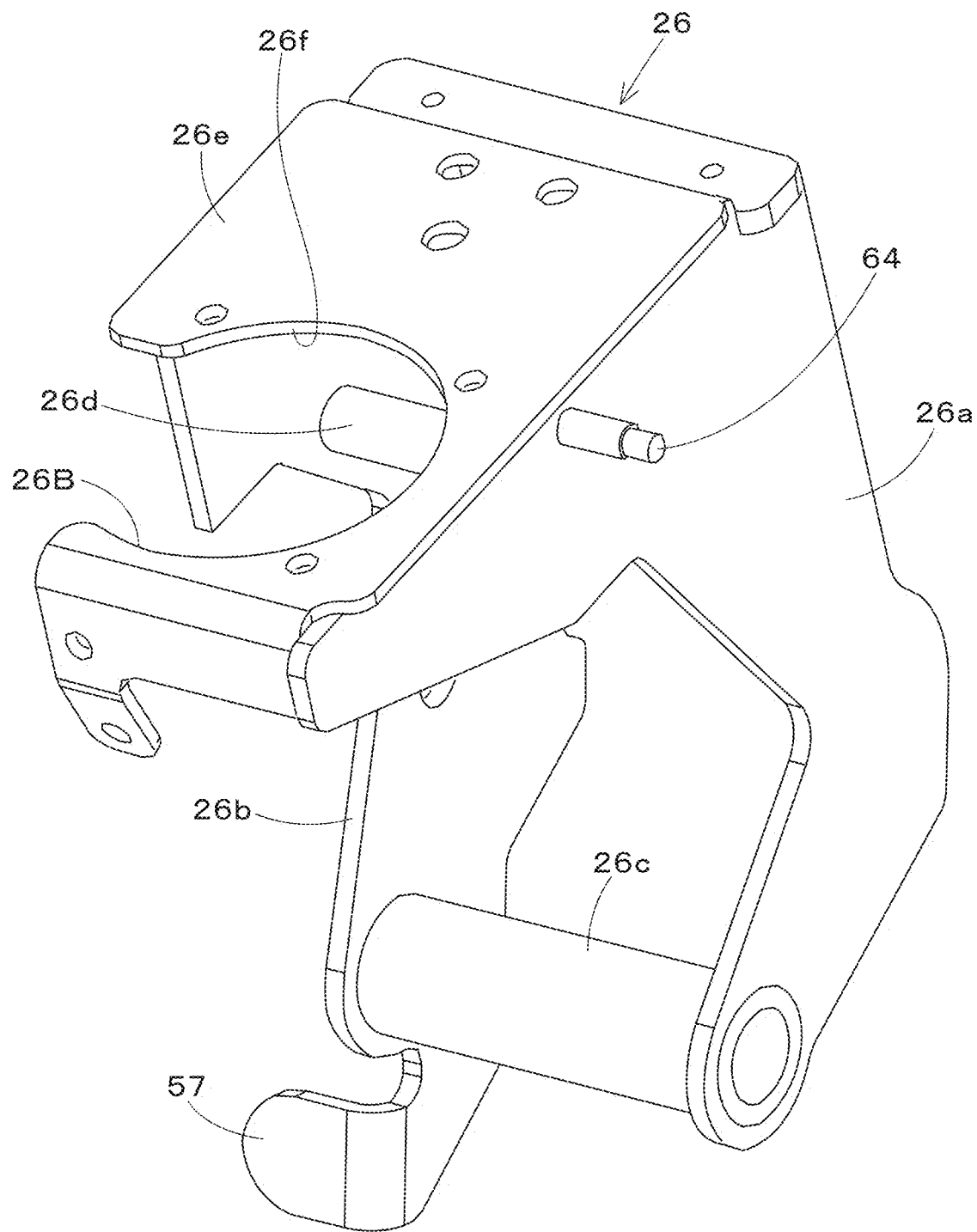
FIG. 7 is a perspective view of a movable body (manipulator box) as seen from the front left.
Figure 8:
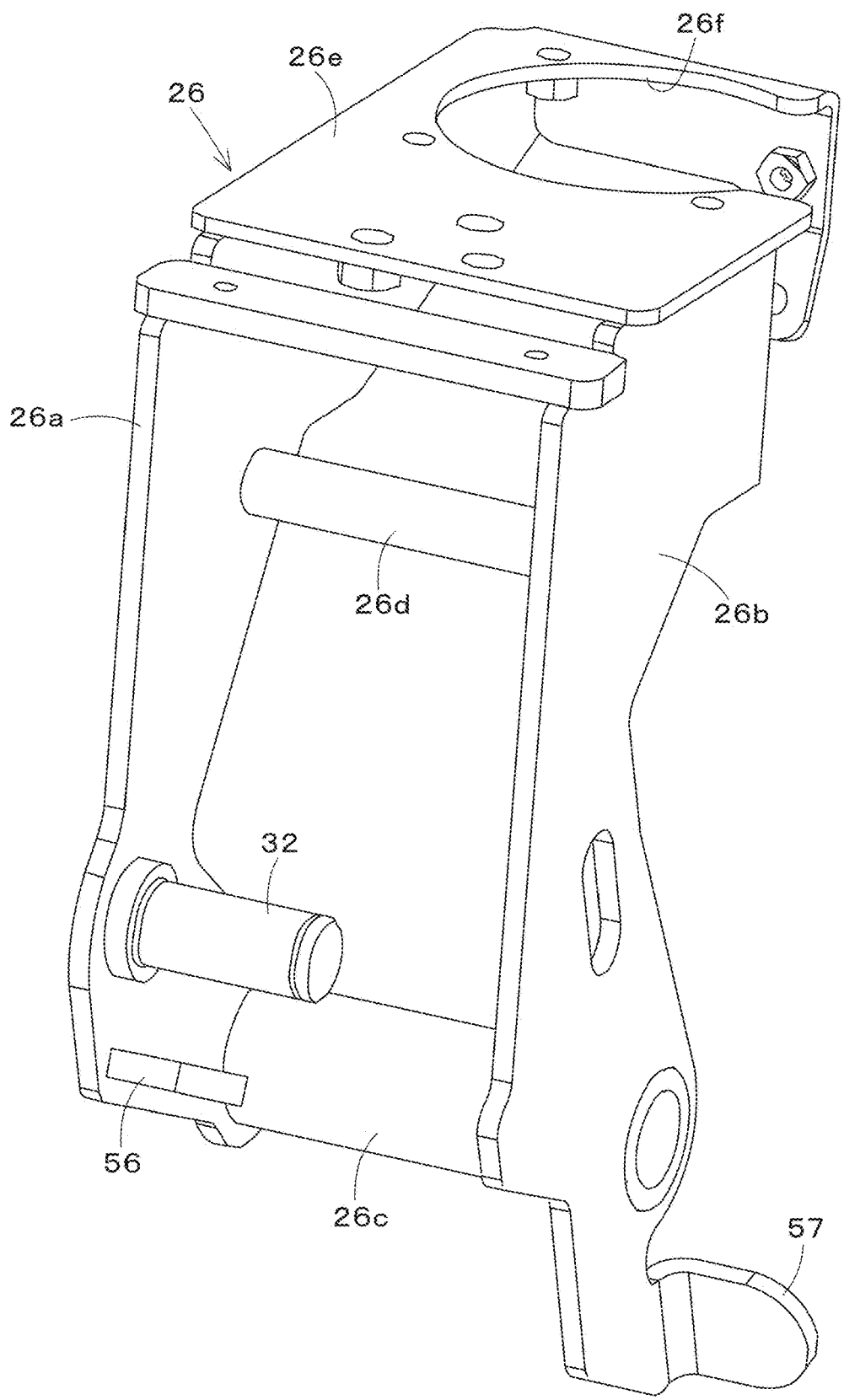
FIG. 8 is a perspective view of a movable body (manipulator box) as seen from the rear right.

FIGS. 7 and 8 show the manipulator box (movable body) 26. The manipulator box 26 includes a left plate 26a and a right plate 26b. The left plate 26a and the right plate 26b are arranged in the machine body width direction with a space between them. A lower front portion of the left plate 26a and a lower front portion of the right plate 26b are connected by a first connector 26c. The first connector 26c is in a cylindrical form. An upper portion of the left plate 26a and an upper portion of the right plate 26b are connected by a second connector 26d. The second connector 26d is in a columnar form. The first connector 26c and the second connector 26d each extend in the machine body width direction.

A mount portion 26e is provided at an upper portion of the manipulator box 26. The mount portion 26e connects an upper edge of the left plate 26a and an upper edge of the right plate 26b. As shown in FIG. 1, a left manipulator valve 28 is attached to the mount portion 26e. The left manipulator valve 28 is a pilot valve for swiveling/arm operation, and is controlled by a left operating lever 30. The left operating lever 30 is attached to an upper portion of the mount portion 26e of the manipulator box 26. As shown in FIGS. 7 and 8, the mount portion 26e includes an opening 26f in the shape of a semicircle or substantially in the shape of a semicircle with an open front right portion. With this, it is possible to attach the left manipulator valve 28 to the opening 26f of the mount portion 26e from the front right side, i.e., from the operator's seat 8 side.

Note that the left manipulator 22 may be a joystick manipulator to output electric signals according to the operation of the left operating lever 30. In such a case, the left manipulator 22 includes a third detector 28 to detect the operation amount and the operation direction of the left operating lever 30, instead of the left manipulator valve 28. The third detector 28 outputs electrical signals to control control valve(s) (solenoid valve(s)) for swiveling/arm operation according to the operation amount and the operation direction of the left operating lever 30.

Figure 3:
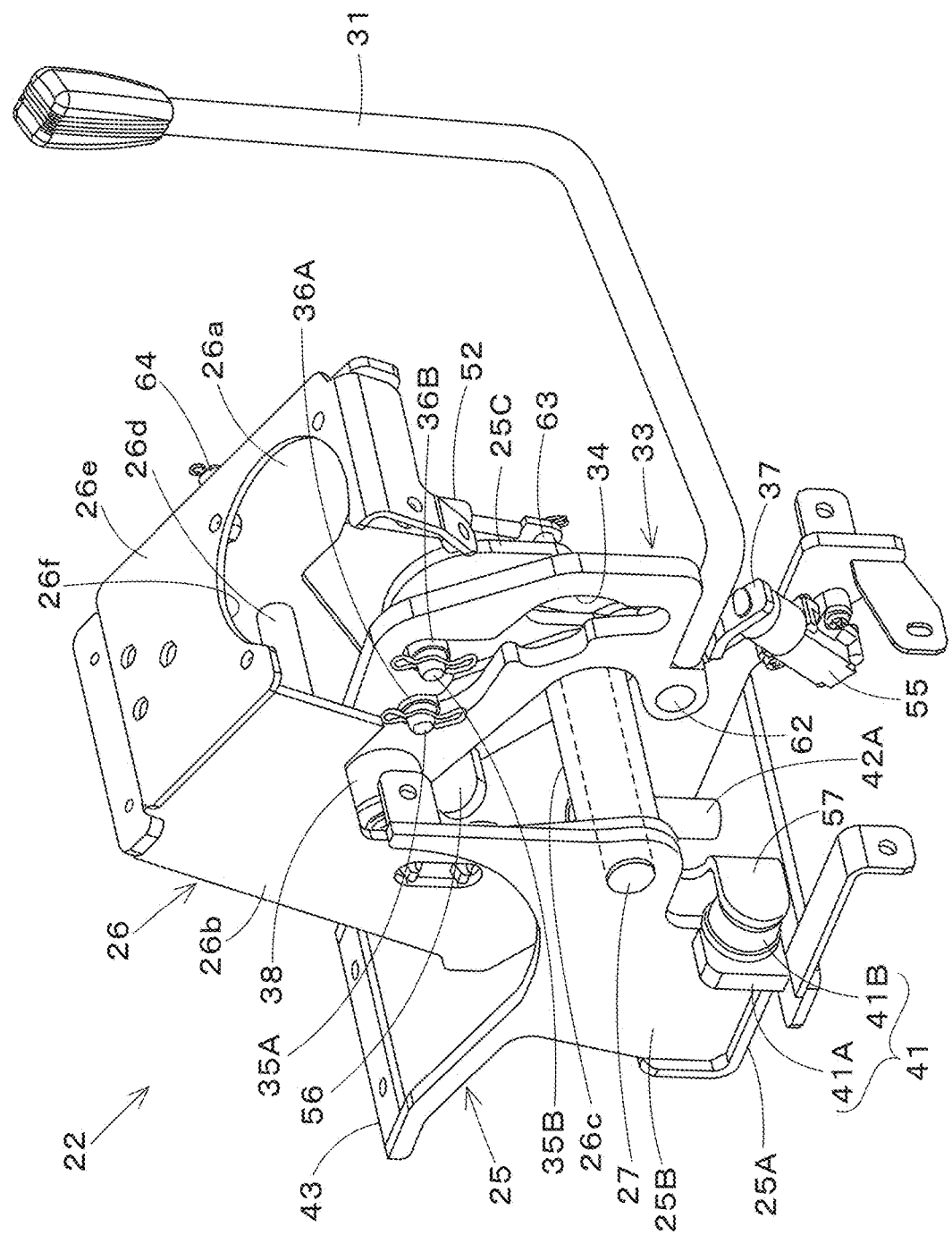
FIG. 3 is a perspective view of a main portion of a lever device as seen from the front right.
Figure 4:
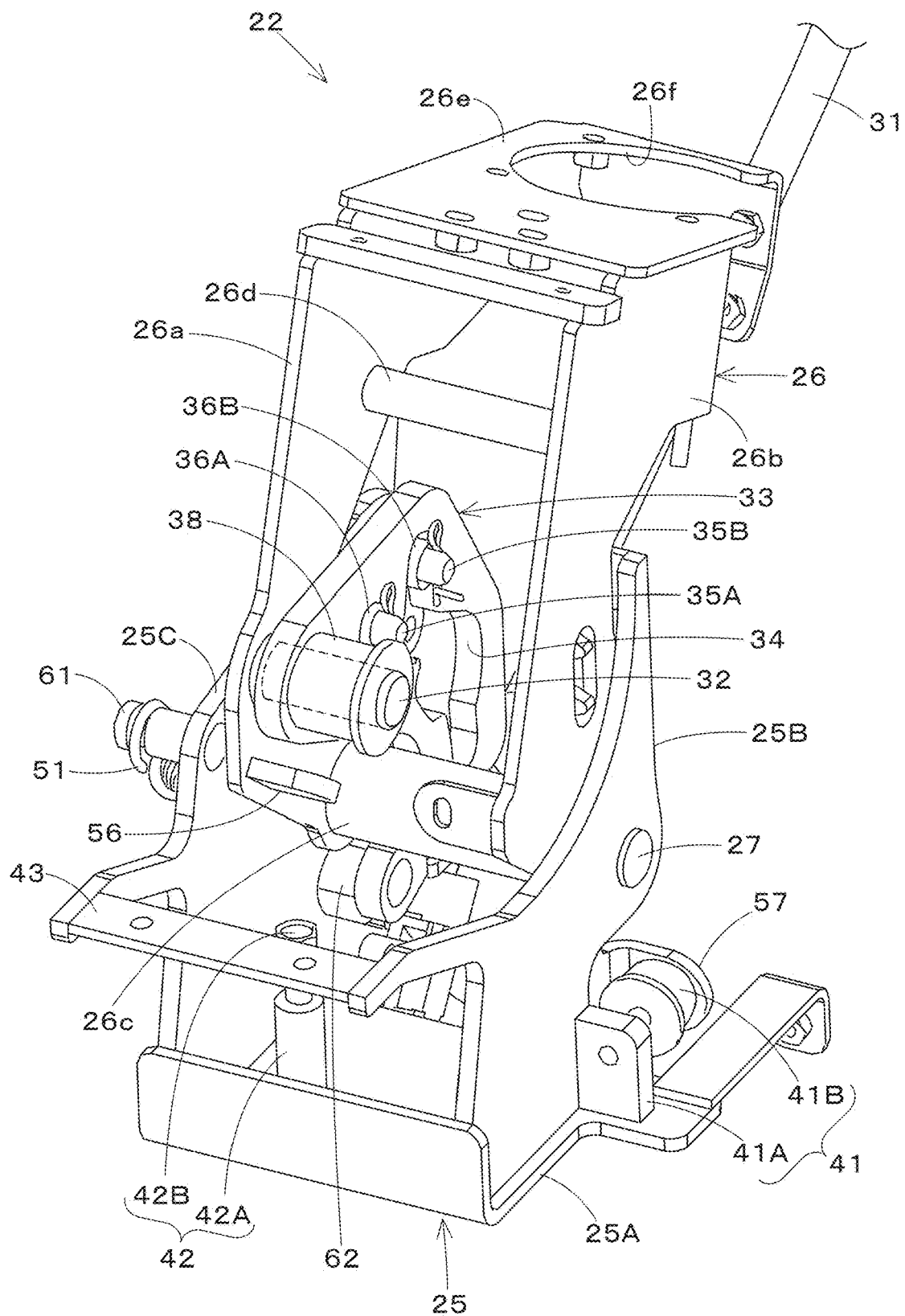
FIG. 4 is a perspective view of a main portion of a lever device as seen from the rear right.

As shown in FIG. 4 and the like, the manipulator box 26 is provided between the first support portion 25B and the second support portion 25C of the support bracket 25. As shown in FIG. 3, the first connector 26c is fitted on the outer surface of the first lateral shaft 27 of the support bracket 25, and is rotatable about the first lateral shaft 27. With this, the manipulator box 26 is supported on the support bracket 25 such that the manipulator box 26 is rotatable on the first lateral shaft 27 (rotatable about the first lateral shaft 27).

As shown in FIG. 5, the second support portion 25C of the support bracket 25 has, projecting therefrom, guide pin(s) 35 each having an axis extending in the machine body width direction. The guide pins 35 each extend in parallel to the first lateral shaft 27. The guide pins 35 each extend from the second support portion 25C rightward (in the inward direction along the machine body width direction). The guide pins 35 are located above the first lateral shaft 27.

As shown in FIGS. 5 and 14, the guide pins 35 include a first guide pin 35A and a second guide pin 35B. The first guide pin 35A and the second guide pin 35B are arranged in the front-rear direction. The second guide pin 35B is provided in front of the first guide pin 35A. As shown in FIG. 14, the second guide pin 35B is located higher than the first guide pin 35A. Note, however, that the difference in position in the up-down direction between the first guide pin 35A and the second guide pin 35B is small, and the positions of the first guide pin 35A and of the second guide pin 35B in the up-down direction overlap each other. In the present example embodiment, the diameters of the first guide pin 35A and the second guide pin 35B are the same. However, the diameters of the first guide pin 35A and of the second guide pin 35B may be different.

As shown in FIG. 5 and the like, the guide pins 35 have attached thereto guide members 36. The guide members 36 include a first guide member 36A and a second guide member 36B. In the present example embodiment, the guide members 36 include guide rollers. The following description is based on the assumption that the guide members 36 are guide rollers 36.

The guide rollers 36 are each in a cylindrical form. The guide rollers 36 are attached to the outer surfaces of the guide pins 35. Each guide roller 36 is rotatable about the axis of the corresponding guide pin 35. The entirety of the guide roller 36 may be rotatable about the axis of the guide pin 35. A portion including at least the outer surface of the guide roller 36 may be rotatable about the axis of the guide pin 35. The guide rollers 36 function as cam followers.

The guide rollers 36 include a first guide roller 36A defining the first guide member 36A, and a second guide roller 36B defining the second guide member 36B. The following description is based on the assumption that the first guide member 36A is the first guide roller 36A and the second guide member 36B is the second guide roller 36B. When the first guide roller 36A and the second guide roller 36B are described collectively, they are referred to as the guide rollers 36.

The first guide roller 36A is attached to the first guide pin 35A. The first guide roller 36A is rotatable about the axis of the first guide pin 35A. The second guide roller 36B is attached to the second guide pin 35B. The second guide roller 36B is rotatable about the axis of the second guide pin 35B. The diameters of the first guide roller 36A and of the second guide roller 36B are the same. However, the diameters of the first guide roller 36A and the second guide roller 36B may be different.

As shown in FIG. 8, the manipulator box 26 is provided, at a rear portion thereof, with a second lateral shaft 32 extending in the machine body width direction (lateral direction). The second lateral shaft 32 projects rightward from the left plate 26a of the manipulator box 26. The second lateral shaft 32 is located diagonally upward and rearward of the first connector 26c. Thus, as shown in FIG. 14, the second lateral shaft 32 is located diagonally rearward and upward of the first lateral shaft 27 inserted in the first connector 26c. The second lateral shaft 32 extends parallel to the first lateral shaft 27.

Figure 9:
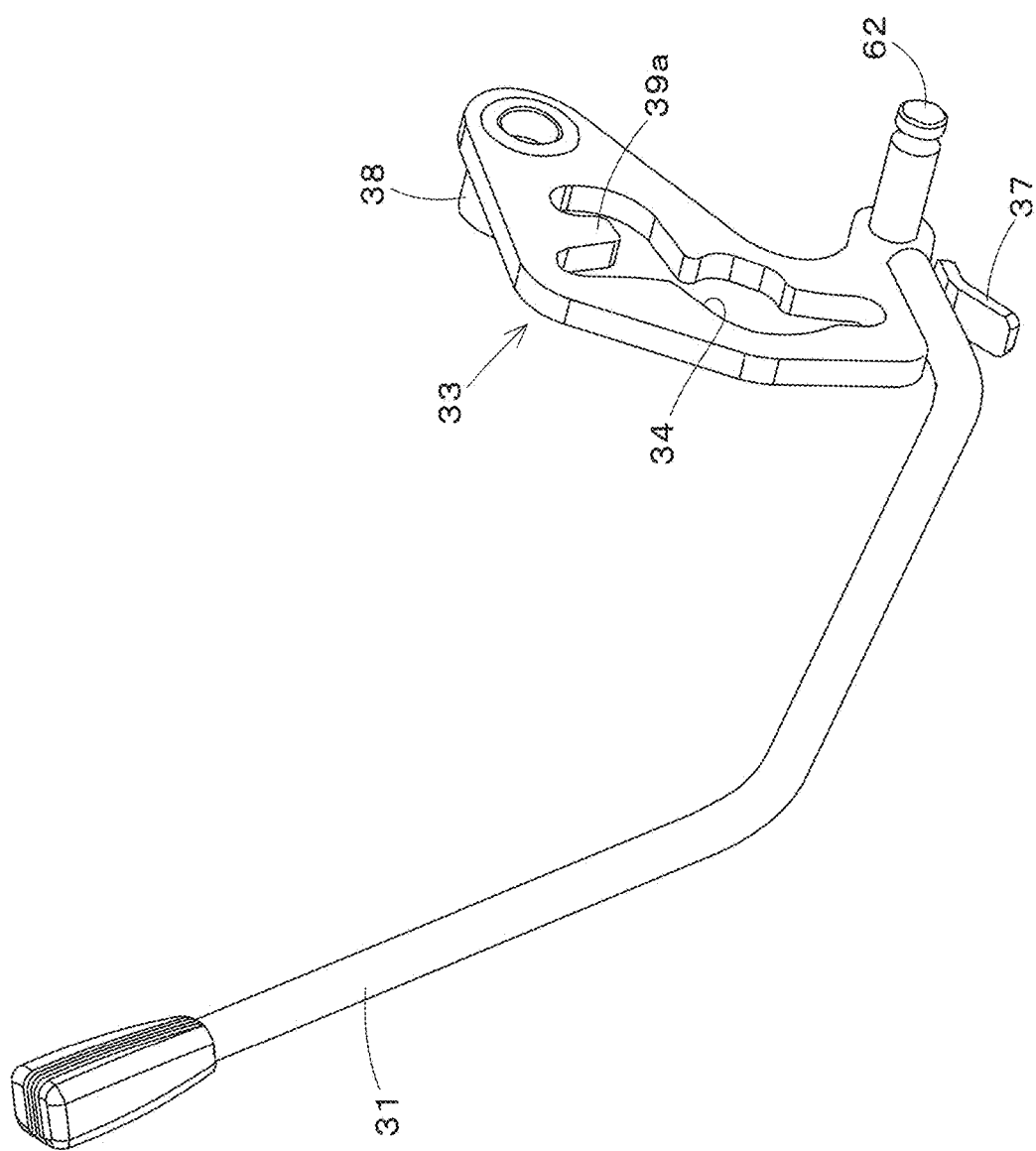
FIG. 9 is a perspective view of a cam body and a lever (unloading lever) as seen from the front left.

As shown in FIG. 4, the cam body 33 is supported via the second lateral shaft 32 on the manipulator box 26. The cam body 33 is in the form of a flat plate. As shown in FIG. 9, a tubular body 38 in the form of a cylinder is fixed to the cam body 33. The tubular body 38 is fixed to an upper rear portion of the cam body 33. The tubular body 38 extends in the machine body width direction (rightward). As shown in FIG. 4 and the like, the tubular body 38 is fitted on the outer surface of the second lateral shaft 32, and is rotatable about the second lateral shaft 32. With this, the cam body 33 is supported rotatably about the second lateral shaft 32.

As shown in FIG. 4 and the like, the cam body 33 is provided between the left plate 26a and the right plate 26b of the manipulator box 26. When the unloading lever 31 is in the depressed position (see FIG. 14), an upper rear portion of the cam body 33 is supported rotatably about the second lateral shaft 32. When the unloading lever 31 is in the depressed position (see FIG. 14), the cam body 33 extends (spreads) from the second lateral shaft 32 frontward and downward. The following description about the directions (up, down, front, rear) relating to the cam body 33 is based on the assumption that the unloading lever 31 is in the depressed position (see FIG. 14).

As shown in FIG. 9 and the like, the unloading lever 31 is fixed to the cam body 33. Specifically, a proximal portion (rear portion) of the unloading lever 31 is fixed to a lower portion of the cam body 33. The unloading lever 31 extends from the lower portion of the cam body 33 diagonally forward and upward. The unloading lever 31 is pivotally supported on the manipulator box 26 via the cam body 33, and is pivotable about the second lateral shaft 32.

By pivoting the unloading lever 31, it is possible to select whether or not to supply hydraulic fluid to all hydraulic actuators (boom cylinder 17, arm cylinder 18, working tool cylinder 19, swing cylinder, dozer cylinder, travel motor(s), swivel motor, other hydraulic actuators detachably connected to service ports, and the like) of the working machine 1.

Note, however, that the unloading lever 31 may be configured such that, by pivoting the unloading lever 31, it is possible to select whether or not to supply hydraulic fluid to only a portion of the hydraulic actuators of the working machine 1 (for example, hydraulic actuator(s) of the working device 4).

As shown in FIGS. 3, 9 and the like, the cam body 33 includes a cam groove 34. As shown in FIG. 14 and the like, the cam groove 34 is located forward of the second lateral shaft 32 (located closer to the unloading lever 31 than the second lateral shaft 32 is). As shown in FIG. 4 and the like, the guide pins 35 (first guide pin 35A, second guide pin 35B) are inserted in the cam groove 34. With this, the guide rollers 36 (first guide roller 36A, second guide roller 36B) attached to the guide pins 35 are also inserted in the cam groove 34. Thus, the guide rollers 36 (first guide roller 36A, second guide roller 36B) are positioned in the cam groove 34.

The guide rollers 36 (first guide roller 36A, second guide roller 36B) change their position relative to the cam groove 34 as the unloading lever 31 is pivoted. Specifically, although the positions of the guide rollers 36 are fixed, as the cam groove 34 moves with the rotation of the cam body 33, the positions of the guide rollers 36 within the cam groove 34 change. In other words, the guide rollers 36 move relative to the cam groove 34.

Figure 10:
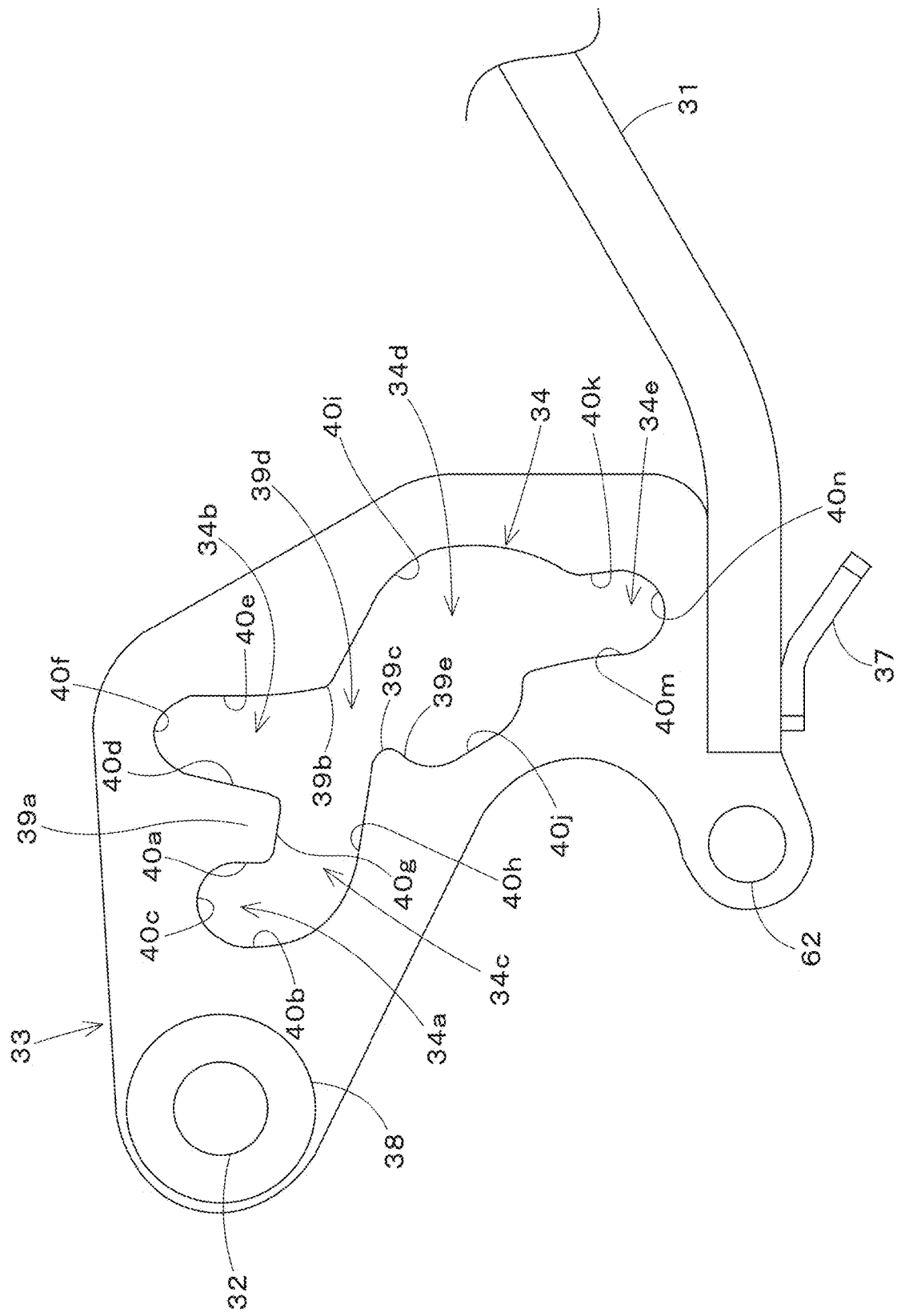
FIG. 10 is a side view of a cam body and a portion of a lever (unloading lever) as seen from the right.

The cam groove 34 is long enough to allow the manipulator box 26 to rotate by a specific angle (for example, about 50 degrees). The following discusses the shape of the cam groove 34 with reference to FIG. 10. FIG. 10 shows the cam body 33 when the unloading lever 31 is in the depressed position (see FIG. 14). As shown in FIG. 10, the cam groove 34 includes a first groove portion 34a and a second groove portion 34b. When the unloading lever 31 is in the depressed position, the first groove portion 34a and the second groove portion 34b each extend upward. In other words, the first groove portion 34a and the second groove portion 34b are each configured such that, when the unloading lever 31 is in the depressed position, the bottom thereof is positioned up and an opening thereof faces downward. It is noted here that an upper edge of the second groove portion 34b is located higher than an upper edge of the first groove portion 34a. The second groove portion 34b is located forward of the first groove portion 34a.

As shown in FIG. 14, when the unloading lever 31 is in the depressed position, the first guide roller 36A is positioned in the first groove portion 34a, and the second guide roller 36B is positioned in the second groove portion 34b. It is noted here that the positions of the first guide roller 36A and the second guide roller 36B in the up-down direction overlap that of the second lateral shaft 32.

As shown in FIG. 10, the cam body 33 includes a projecting portion 39a projecting toward the interior of the cam groove 34. For convenience of description, the projecting portion 39a is hereinafter referred to as a first projecting portion 39a. The first projecting portion 39a projects toward the interior of the cam groove 34 to separate the first groove portion 34a and the second groove portion 34b. When the unloading lever 31 is in the depressed position, the first projecting portion 39a projects downward. As shown in FIG. 14, when the unloading lever 31 is in the depressed position, the first projecting portion 39a is located between the first guide roller 36A and the second guide roller 36B.

Figure 11:
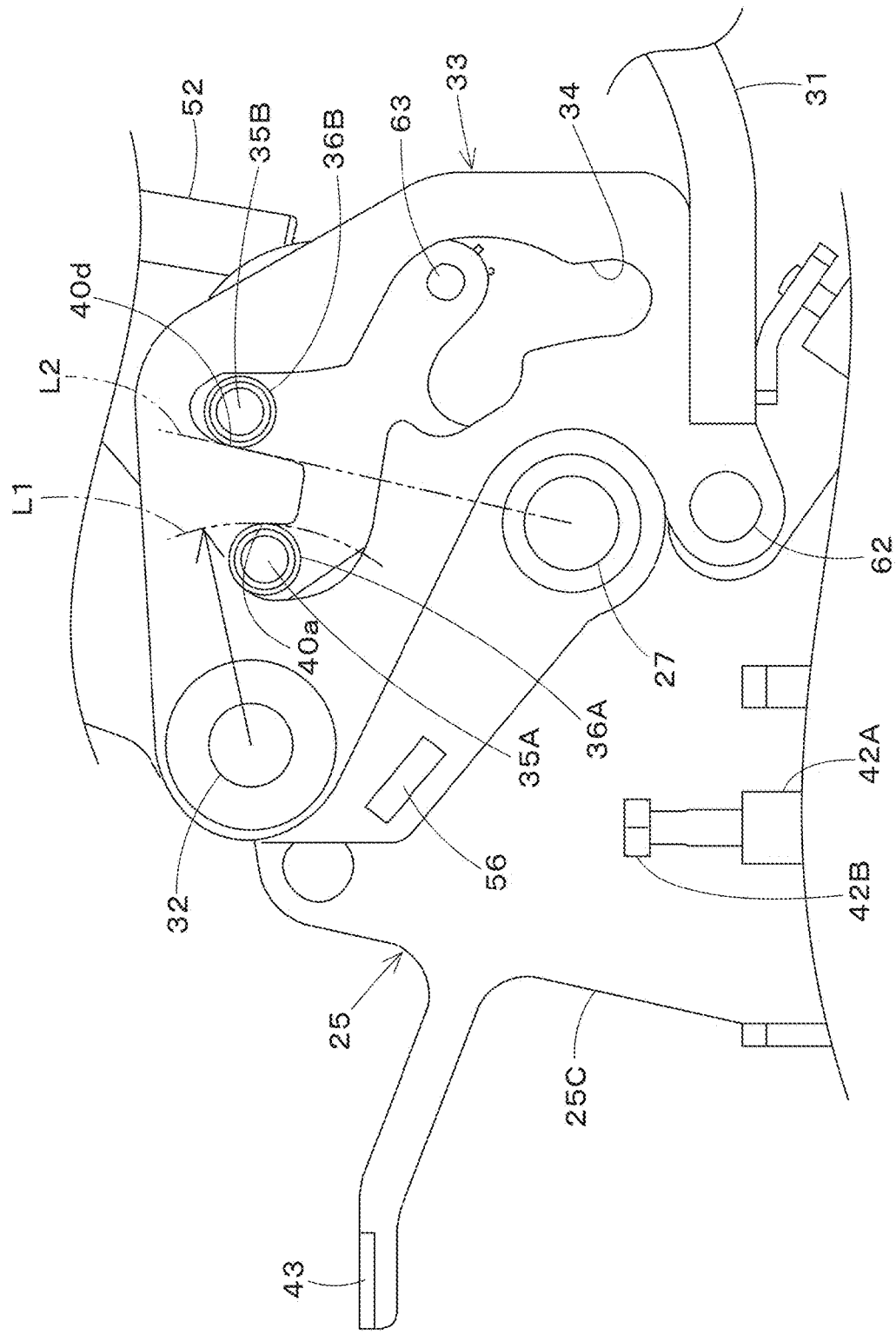
FIG. 11 illustrates the shapes of a first inner surface of a first groove and a third inner surface of a second groove.

As shown in FIG. 10, the first groove portion 34a includes a first inner surface 40a located on the same side of the first groove portion 34a as the second groove portion 34b, and a second inner surface 40b located on the opposite side of the first groove portion 34a from the second groove portion 34b. The first inner surface 40a and the second inner surface 40b are positioned to face each other. The first inner surface 40a and the second inner surface 40b are connected by a first connecting surface 40c in the shape of an arc or substantially in the shape of an arc. As indicated by dot-dot-dash line L1 in FIG. 11, the first inner surface 40a is in the shape of an arc centered on the axis of the second lateral shaft 32.

The second groove portion 34b includes a third inner surface 40d located on the same side of the second groove portion 34b as the first groove portion 34a, and a fourth inner surface 40e located on the opposite side of the second groove portion 34b from the first groove portion 34a. The third inner surface 40d and the fourth inner surface 40e are positioned to face each other. The third inner surface 40d and the fourth inner surface 40e are connected by a second connecting surface 40f in the shape of an arc or substantially in the shape of an arc. The third inner surface 40d is linear and, when the lever 31 is in the depressed position, the axis of the first lateral shaft 27 is on an extension L2 of the third inner surface 40d (see FIG. 11). The fourth inner surface 40e is also linear. The distance between the third inner surface 40d and the fourth inner surface 40e increases with increasing distance from the second connecting surface 40f. In other words, when the unloading lever 31 is in the depressed position, the width of the second groove portion 34b increases in the downward direction.

Figure 12:
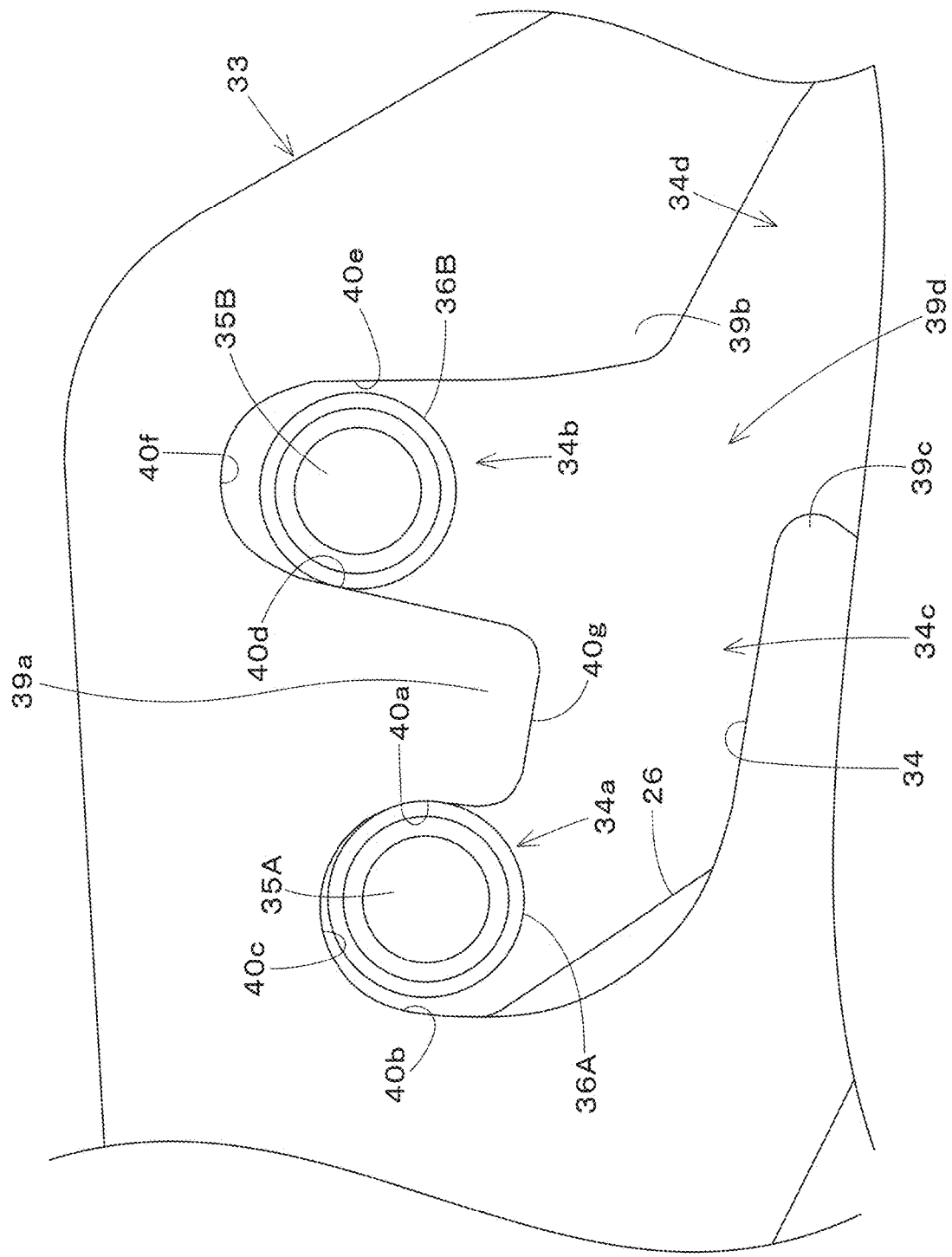
FIG. 12 illustrates a positional relationship between (i) a first guide member and a second guide member and (ii) a first groove and a second groove, when an unloading lever is in a depressed position.
Figure 13:
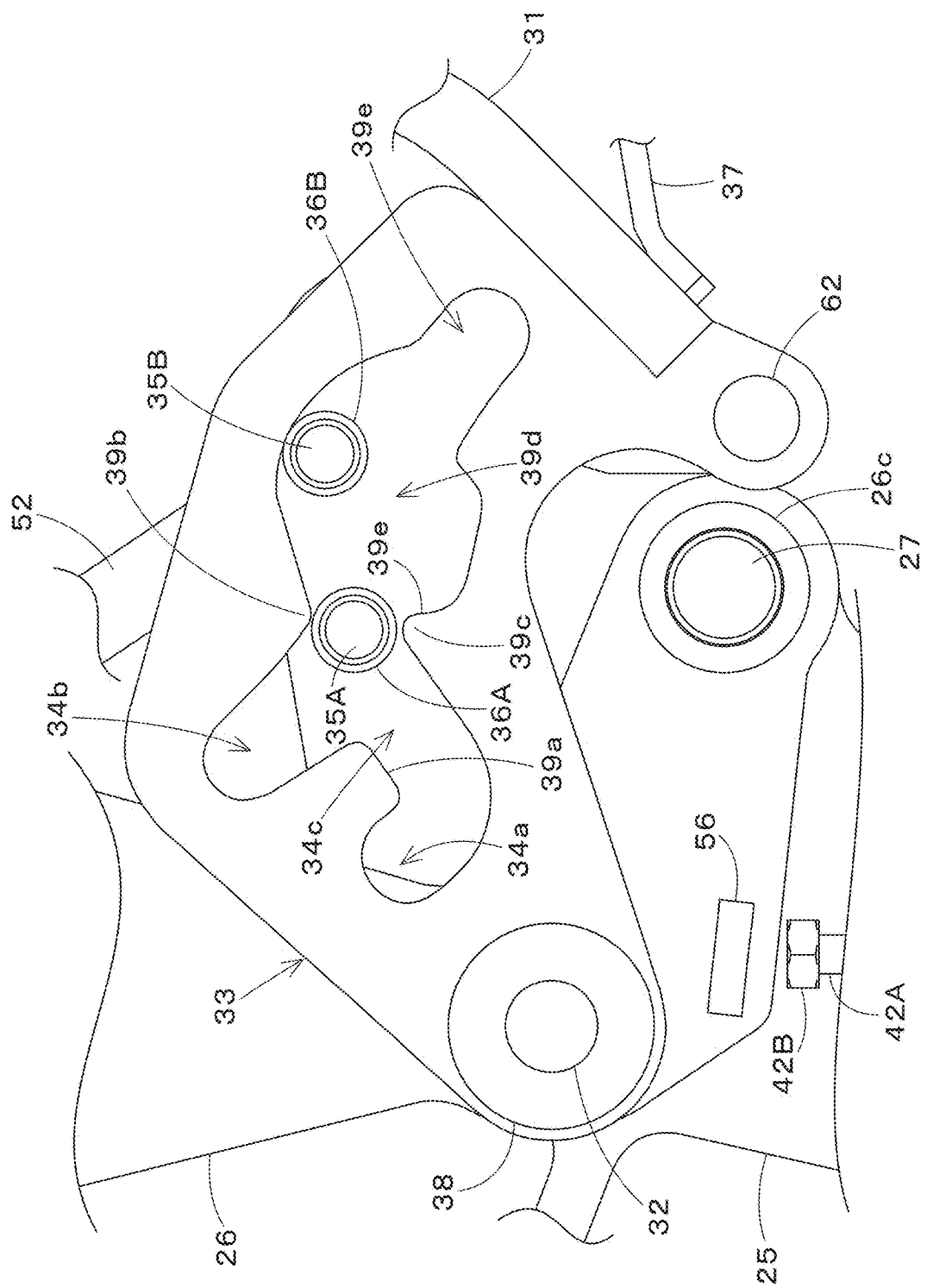
FIG. 13 illustrates a positional relationship between an engagement portion of a cam groove and a first lateral shaft.

As shown in FIG. 12, when the unloading lever 31 is in the depressed position, the first guide roller 36A is positioned in a portion surrounded by the first inner surface 40a, the second inner surface 40b, and the first connecting surface 40c. The second guide roller 36B is positioned in a portion surrounded by the third inner surface 40d, the fourth inner surface 40e, and the second connecting surface 40f.

As shown in FIG. 12, when the first guide roller 36A is positioned in the first groove portion 34a, the first guide roller 36A abuts the first inner surface 40a and is separate from the second inner surface 40b. When the second guide roller 36B is positioned in the second groove portion 34b, the second guide roller 36B abuts the third inner surface 40d and is separate from the fourth inner surface 40e.

Note that the following configuration (not illustrated) may be used: when the first guide roller 36A is positioned in the first groove portion 34a, the first guide roller 36A abuts the second inner surface 40b and is separate from the first inner surface 40a, and when the second guide roller 36B is positioned in the second groove portion 34b, the second guide roller 36B abuts the fourth inner surface 40e and is separate from the third inner surface 40d.

As shown in FIG. 10, the cam groove 34 includes a third groove portion 34c. The third groove portion 34c communicates with the first groove portion 34a and the second groove portion 34b. That is, the third groove portion 34c connects the first groove portion 34a and the second groove portion 34b. Specifically, the third groove portion 34c communicates with the first groove portion 34a, the second groove portion 34b, a fourth groove portion 34d (described later), and a fifth groove portion 34e (described later). When the unloading lever 31 is in the depressed position (see FIG. 14), the third groove portion 34c extends in the front-rear direction to connect a lower portion of the first groove portion 34a and a lower portion of the second groove portion 34b. It is noted here that the third groove portion 34c extends diagonally forward and downward such that the third groove portion 34c slopes downward in the forward direction. The width of the third groove portion 34c is the same or substantially the same as the width of the first groove portion 34a. The width of the third groove portion 34c is smaller than the width of a lower end portion of the second groove portion 34b.

The third groove portion 34c is wide enough for the guide rollers 36 to pass therethrough. Specifically, the width of the third groove portion 34c is substantially equal to the width of a single guide roller 36 (is slightly larger than the width of a single guide roller 36). As described later, when the unloading lever 31 is pivoted between the depressed position and the raised position, the first guide roller 36A and the second guide roller 36B move through (along) the third groove portion 34c.

The third groove portion 34c includes a fifth inner surface 40g, and a sixth inner surface 40h. The fifth inner surface 40g and the sixth inner surface 40h are positioned to face each other. When the unloading lever 31 is in the depressed position, the fifth inner surface 40g is positioned above the sixth inner surface 40h, and the sixth inner surface 40h is positioned below the fifth inner surface 40g.

The fifth inner surface 40g of the third groove portion 34c connects the first inner surface 40a of the first groove portion 34a and the third inner surface 40d of the second groove portion 34b. That is, the first inner surface 40a, the third inner surface 40d, and the fifth inner surface 40g are continuous surfaces. The first inner surface 40a, the third inner surface 40d, and the fifth inner surface 40g define an outer surface of the first projecting portion 39a. The first projecting portion 39a extends toward the sixth inner surface 40h of the third groove portion 34c.

As shown in FIG. 10, the cam groove 34 includes the fourth groove portion 34d. The fourth groove portion 34d communicates with the third groove portion 34c. When the unloading lever 31 is in the depressed position, the fourth groove portion 34d extends diagonally frontward and downward from a front end portion of the third groove portion 34c. The width of the fourth groove portion 34d increases in the diagonally forward and downward direction from the front end portion of the third groove portion 34c. When the unloading lever 31 is in the raised position, the first guide roller 36A is positioned in the fourth groove portion 34d.

The fourth groove portion 34d includes a seventh inner surface 40i and an eighth inner surface 40j. The seventh inner surface 40i and the eighth inner surface 40j are positioned to face each other. The seventh inner surface 40i is continuous with the fourth inner surface 40e of the second groove portion 34b. The seventh inner surface 40i is curved in the shape of an arc or substantially in the shape of an arc to widen the fourth groove portion 34d. The eighth inner surface 40j is continuous with the sixth inner surface 40h of the third groove portion 34c. The eighth inner surface 40j is curved in the shape of a trapezoid or substantially in the shape of a trapezoid to widen the fourth groove portion 34d. When the unloading lever 31 is in the depressed position, the seventh inner surface 40i extends further downward than (extends downward to a greater extent than) the eighth inner surface 40j.

A second projecting portion 39b extending toward the interior of the cam groove 34 is provided at a portion extending from the fourth inner surface 40e to the seventh inner surface 40i. A third projecting portion 39c extending toward the interior of the cam groove 34 is provided at a portion extending from the sixth inner surface 40h to the eighth inner surface 40j. The second projecting portion 39b and the third projecting portion 39c are positioned to face each other. When the unloading lever 31 is in the raised position (see FIG. 17), the third projecting portion 39c projects upward toward the interior of the cam groove 34. In the following description, the third projecting portion 39c may be referred to as inwardly projecting portion 39c.

A communication portion 39d having a width equal to or substantially equal to a single guide roller 36 is provided between the second projecting portion 39b and the third projecting portion 39c. The communication portion 39d is a portion via which the third groove portion 34c and the fourth groove portion 34d communicate with each other.

When the unloading lever 31 is in the raised position, a portion 39e of the outer surface of the third projecting portion (inwardly projecting portion) 39c defines an engagement portion (hereinafter referred to as an engagement portion 39e) to engage with the first guide roller 36A. In other words, the cam groove 34 includes the engagement portion 39e to engage with the first guide roller 36A when the unloading lever 31 is in the raised position. As shown in FIG. 17, when the unloading lever 31 is in the raised position and the engagement portion 39e and the first guide roller 36A abut each other, the axis of the first lateral shaft 27 is on a tangent L3 to the outer surface of the first guide roller 36A that passes through the engagement portion 39e.

As shown in FIG. 10, the cam groove 34 includes a fifth groove portion 34e. The fifth groove portion 34e communicates with the fourth groove portion 34*d*. In the state where the unloading lever 31 is in the depressed position, the fifth groove portion 34*e* extends downward from the fourth groove portion 34*d*. The width of the fifth groove portion 34*e* is smaller than the width of the fourth groove portion 34*d*. The width of the fifth groove portion 34*e* is equal to or substantially equal to the width of a single guide roller 36. When the unloading lever 31 is in the raised position, the second guide roller 36B is positioned in the fifth groove portion 34*e*.

The fifth groove portion 34*e* includes a ninth inner surface 40*k* and a tenth inner surface 40*m*. The ninth inner surface 40*k* and the tenth inner surface 40*m* are positioned to face each other. The ninth inner surface 40*k* is continuous with the seventh inner surface 40*i* of the fourth groove portion 34*d*. The tenth inner surface 40*m* is continuous with the eighth inner surface 40*j* of the fourth groove portion 34*d*. A lower portion of the ninth inner surface 40*k* and a lower portion of the tenth inner surface 40*m* are connected by a third connection surface 40*n* in the shape of an arc or substantially in the shape of an arc.

The foregoing first groove portion 34*a*, second groove portion 34*b*, third groove portion 34*c*, fourth groove portion 34*d*, and fifth groove portion 34*e* are all connected together to define a single cam groove 34. The two guide rollers (first guide roller 36A and second guide roller 36B) are provided in the single cam groove 34.

When the unloading lever 31 is in the depressed position (see FIG. 14), the first guide roller 36A is positioned in the first groove portion 34*a*, and the second guide roller 36B is positioned in the second groove portion 34*b*. When the unloading lever 31 is in the raised position (see FIG. 17), the first guide roller 36A is positioned in the fourth groove portion 34*d*, and the second guide roller 36B is positioned in the fifth groove portion 34*e*. Pivoting the unloading lever 31 between the depressed position and the raised position causes the first guide roller 36A and the second guide roller 36B to change their position within the cam groove 34 (move within the cam groove 34).

As is apparent by looking at FIGS. 14, 15, 16 and 17 in this order, when the unloading lever 31 is raised, the cam body 33 rotates upward about the second lateral shaft 32. In so doing, the first guide roller 36A moves from the first groove portion 34*a* via the third groove portion 34*c* to the fourth groove portion 34*d*. The second guide roller 36B moves from the second groove portion 34*b* via the third groove portion 34*c* and the fourth groove portion 34*d* to the fifth groove portion 34*e*.

As is apparent by looking at FIGS. 17, 16, 15, and 14 in this order, when the unloading lever 31 is depressed, the cam body 33 rotates downward about the second lateral shaft 32. In so doing, the first guide roller 36A moves from the fourth groove portion 34*d* via the third groove portion 34*c* to the first groove portion 34*a*. The second guide roller 36B moves from the fifth groove portion 34*e* via the fourth groove portion 34*d* and the third groove portion 34*c* to the second groove portion 34*b*.

Figure 2:
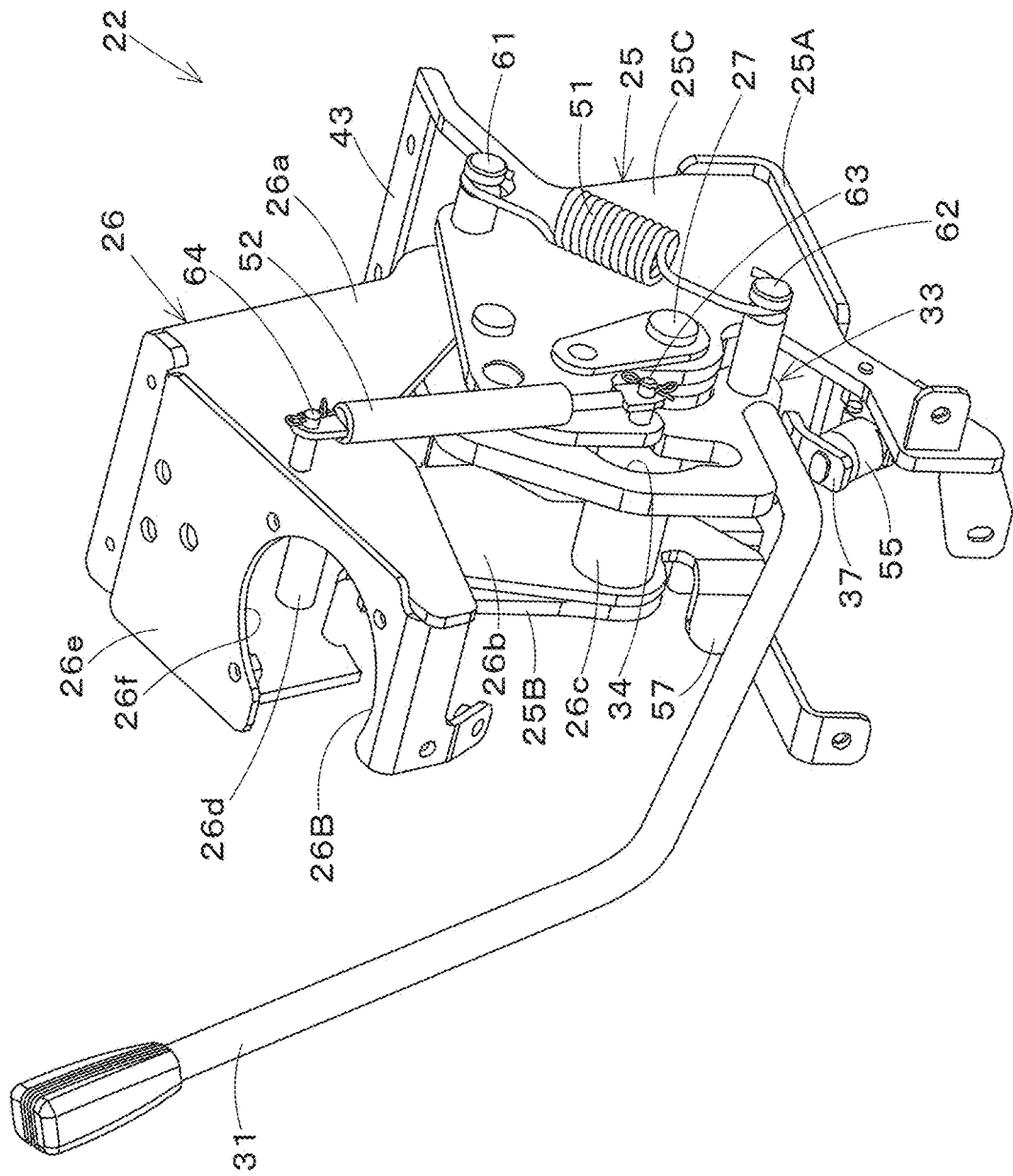
FIG. 2 is a perspective view of a main portion of a lever device as seen from the front left.

As shown in FIGS. 2, 14 and the like, the support bracket 25 and the cam body 33 are connected by a tension spring which is a first biasing member 51. Note that, for simple illustration, the first biasing member 51 is represented by a dot-dash line in some of the drawings (FIG. 14 and the like).

When the unloading lever 31 is in the depressed position (see FIG. 14), the first biasing member 51 imparts a biasing force to the cam body 33 to rotate the cam body 33 about the second lateral shaft 32 in a direction that lowers the unloading lever 31. The biasing force of the first biasing member 51 keeps the first guide roller 36A in the first groove portion 34*a*, and keeps the second guide roller 36B in the second groove portion 34*b*. In so doing, the biasing force of the first biasing member 51 causes the first guide roller 36A to abut the first inner surface 40*a*, and causes the second guide roller 36B to abut the third inner surface 40*d* (see FIG. 12).

When the unloading lever 31 is in the raised position (see FIG. 17), the first biasing member 51 imparts a biasing force to the cam body 33 to cause the cam body 33 to rotate about the second lateral shaft 32 in a direction that raises the unloading lever 31. In so doing, the pulling biasing force of the first biasing member 51 causes the first guide roller 36A to abut the eighth inner surface 40*j* of the fourth groove portion 34*d*. In other words, when the unloading lever 31 is in the raised position, the first biasing member 51 imparts a biasing force to cause the first guide roller 36A to abut the eighth inner surface 40*j* of the fourth groove portion 34*d*.

As shown in FIGS. 2, 6 and the like, the support bracket 25 includes a first connector 61 to be connected to an end portion (upper end portion) of the first biasing member 51. The first connector 61 is a shaft body fixed to an upper rear portion of the second support portion 25C, and projects leftward from the second support portion 25C. As shown in FIG. 14, when the unloading lever 31 is in the depressed position, the first connector 61 is located diagonally rearward and upward of the first lateral shaft 27, and rearward of the second lateral shaft 32.

As shown in FIGS. 2, 9 and the like, the cam body 33 includes a second connector 62 to be connected to the opposite end portion (lower end portion) of the first biasing member 51. The second connector 62 is a shaft body fixed to a lower rear portion of the cam body 33, and projects leftward from the cam body 33. The first connector 61 is located diagonally rearward and upward of the second connector 62. As shown in FIG. 14, when the unloading lever 31 is in the depressed position, the second connector 62 is located below the first lateral shaft 27 and diagonally forward and downward of the second lateral shaft 32.

As shown in FIG. 2 and the like, the support bracket 25 and the manipulator box 26 are connected by a gas spring which is a second biasing member 52. The second biasing member 52 imparts a biasing force to the manipulator box 26 to cause the manipulator box 26 to rotate about the first lateral shaft 27 in a direction that raises the operating lever (left operating lever 30 (see FIG. 1)). The second biasing member 52 imparts an expanding biasing force to assist the left manipulator 22 (manipulator box 26) in rotating upward.

As shown in FIGS. 2, 5, 6 and the like, the second support portion 25C of the support bracket 25 includes a third connector 63 to be connected to an end portion (lower end portion) of the second biasing member 52. The third connector 63 is a shaft body fixed to a front portion of the second support portion 25C, and projects leftward from the first support portion 25B. The third connector 63 is located diagonally forward and upward of the first lateral shaft 27.

As shown in FIGS. 2, 7 and the like, the manipulator box 26 includes a fourth connector 64 to be connected to the opposite end portion (upper end portion) of the second biasing member 52. The fourth connector 64 is a shaft body fixed to an upper portion of the left plate 26*a* of the manipulator box 26, and projects leftward from the left plate 26*a*.

As shown in FIGS. 2, 3, 9 and the like, a stay 37 is fixed to a lower portion of the proximal portion of the unloading lever 31. As shown in FIGS. 2, 5, 6 and the like, a rotation detector 55 including a limit switch is attached to a lower front portion of the manipulator box 26. When the unloading lever 31 is in the depressed position (see FIG. 14), the switch piece (actuator) at an end of the rotation detector 55 engages with the stay 37.

The rotation detector 55 is connected to an electronic controller of a hydraulic circuit. The electronic controller actuates an unloading valve (not illustrated) provided in the hydraulic circuit according to the detection result from the rotation detector 55. That is, the unloading valve is switched, according to the position of the unloading lever 31, between a state in which hydraulic fluid delivered by a hydraulic pump is allowed to be supplied to hydraulic actuators, and a state in which hydraulic fluid delivered by the hydraulic pump is not allowed to be supplied to the hydraulic actuators (a state in which hydraulic fluid delivered by the hydraulic pump is not supplied to hydraulic actuators but is returned to a hydraulic fluid tank). Note that, although a configuration in which the operation of the unloading valve is electronically controlled is described in the present example embodiment, this does not imply any limitation. For example, the operation of the unloading valve may be switched mechanically.

When the unloading lever 31 is raised from the depressed position as shown in FIG. 14, a front portion of the cam body 33 rotates upward about the second lateral shaft 32, and the stay 37 moves (pivots) rearward together with the cam body 33. The actuator of the rotation detector 55 extends out as the stay 37 moves. With this, the raising of the unloading lever 31 (unloading state) is detected, and the operation of hydraulic actuators is prohibited.

As shown in FIGS. 3 and 5, a first abutment mechanism 41 is provided at the first support portion 25B of the support bracket 25. The first abutment mechanism 41 keeps the left manipulator 22 in a use position (described later, see FIG. 14). The use position of the left manipulator 22 is the position of the left manipulator 22 when the unloading lever 31 is in the depressed position.

The first abutment mechanism 41 includes a mount plate 41A fixed to a lower portion of the first support portion 25B, and a first abutment member 41B attached to the mount plate 41A. As shown in FIG. 3, when the left manipulator 22 is in the use position, the first abutment member 41B abuts a first abutment plate 57 (see FIG. 7) fixed to the right plate 26b of the manipulator box 26. With this, the left manipulator 22 is kept in the use position (see FIG. 14).

As shown in FIGS. 4, 14 and the like, a second abutment mechanism 42 is provided at an upper portion of the attachment portion 25A of the support bracket 25. The second abutment mechanism 42 holds the left manipulator 22 in an upward pivoted position (retracted position) (described later, see FIG. 17). The second abutment mechanism 42 includes a column 42A fixed to the support bracket 25, and a second abutment member 42B attached to an upper portion of the column 42A. The second abutment member 42B is a bolt extending in the up-down direction screwed in the column 42A.

When the left manipulator 22 is in the upward pivoted position (see FIG. 17), the second abutment member 42B abuts a second abutment plate 56 fixed to the left plate 26a of the manipulator box 26. The upward pivoted position of the left manipulator 22 is the position of the left manipulator 22 when the unloading lever 31 is in the raised position. The second abutment plate 56 projects rightward from the left plate 26a (see FIG. 8).

A rotation mechanism 29 to cause the left manipulator 22 to rotate includes the foregoing first lateral shaft 27, cam body 33, unloading lever 31, rotation detector 55, first abutment mechanism 41, second abutment mechanism 42, and the like. As shown in FIG. 17, when the left manipulator 22 is pivoted upward (retracted) by the rotation mechanism 29, the unloading lever 31 is oriented upward. This makes more space available for the entrance/exit 20a (see FIG. 19) located diagonally leftward of the operator's seat 8 (i.e., forward of the left manipulator 22), eliminating or reducing the likelihood that the left manipulator 22 will interfere with the operator who enters or exits the vehicle.

The following specifically discusses the pivoting operation of the left manipulator 22 performed by pivoting the unloading lever 31 with reference to FIGS. 14 to 17. The following description first discusses the state in which the unloading lever 31 is in the depressed position and the state in which the unloading lever 31 is in the raised position, and then discusses the operation of the left manipulator 22 caused by the operation (depressing, raising) of the unloading lever 31.

Note that, for simple illustration, some elements not necessary for following the description are not illustrated in in some drawings. For example, in FIGS. 14 to 17, the first support portion 25B and the right plate 26b are not illustrated.

State in which Unloading Lever is in Depressed Position

First, the state in which the unloading lever 31 is in the depressed position will be described.

FIGS. 1 and 14 are side views of the unloading lever 31 in the depressed position. The left manipulator 22 is configured such that the position as shown in FIGS. 1 and 14 is the use position (normal work position) for when the working machine 1 performs work. When the left manipulator 22 is in the use position, the first abutment mechanism 41 (FIG. 3) restricts the manipulator box 26 from rotating downward about the first lateral shaft 27, and the left manipulator 22 is kept in the use position. Specifically, the first abutment member 41B abuts the first abutment plate 57 to keep the left manipulator 22 in the use position.

As shown in FIG. 14, when the left manipulator 22 is in the use position (the unloading lever 31 is in the depressed position), the first guide roller 36A is positioned in the first groove portion 34a of the cam groove 34. The second guide roller 36B is positioned in the second groove portion 34b of the cam groove 34. It is noted here that, as shown in FIG. 12, the first guide roller 36A abuts the first inner surface 40a of the first groove portion 34a, and is separate from the second inner surface 40b of the first groove portion 34a. The second guide roller 36B abuts the third inner surface 40d of the second groove portion 34b, and is separate from the fourth inner surface 40e of the second groove portion 34b.

Since the first guide roller 36A abuts the first inner surface 40a of the first groove portion 34a and the second guide roller 36B abuts the third inner surface 40d of the second groove portion 34b as such, the cam body 33 is prevented from moving in the front-rear direction relative to the base 25. This makes it possible to prevent or reduce rattling that would occur when the left operating lever 30 is operated. Furthermore, since the first guide roller 36A is separate from the second inner surface 40b of the first groove portion 34a and the second guide roller 36B is separate from the fourth inner surface 40e of the second groove portion 34b, the first guide roller 36A moves smoothly within the first groove portion 34a and the second guide roller 36B moves smoothly within the second groove portion 34b.

When the left manipulator 22 is in the use position, the first biasing member 51 imparts, to the cam body 33, a biasing force in a direction that causes the cam body 33 to rotate downward (clockwise in FIG. 14) about the second lateral shaft 32. With this, since the cam body 33 is restricted from rotating upward, the manipulator box 26 is prevented from automatically rotating upward by the biasing force of the second biasing member 52. Furthermore, the biasing force imparted by the first biasing member 51 keeps the first guide roller 36A in the first groove portion 34*a* of the cam body 33, and keeps the second guide roller 36B in the second groove portion 34*b* of the cam body 33.

When the left manipulator 22 is in this use position, the unloading lever 31 is in a not-unloading position, and therefore the rotation detector 55 is ON and does not detect the upward rotation of the unloading lever 31. Thus, in such a condition, hydraulic actuators are allowed to be actuated.

State in which Unloading Lever is in Raised Position

Next, the state in which the unloading lever 31 is in the raised position will be described.

FIG. 17 shows the unloading lever 31 in the raised position. The left manipulator 22 (manipulator box 26) is configured such that the position as shown in FIG. 17 is the upward pivoted position (retracted position). In such a condition, the left manipulator 22 is kept in the upward pivoted position by the second abutment member 42B of the second abutment mechanism 42 abutting the second abutment plate 56 fixed to the left plate 26*a*. When the left manipulator 22 is in the upward pivoted position, the left manipulator 22 retracts rearward from the use position and the unloading lever 31 is oriented upward, making more space available for the entrance/exit 20*a* located diagonally leftward and forward of the operator's seat 8 (located forward of the left manipulator 22).

When the left manipulator 22 is in the upward pivoted position (the unloading lever 31 is in the raised position), the unloading lever 31 is in the unloading position, and therefore the rotation detector 55 is OFF and the unloading state achieved by the unloading lever 31 is detected. In such a condition, hydraulic actuators are not allowed to be actuated.

When the left manipulator 22 is in the upward pivoted position, the first guide roller 36A is positioned in the fourth groove portion 34*d* of the cam groove 34. The second guide roller 36B is positioned in the fifth groove portion 34*e* of the cam groove 34. The first guide roller 36A abuts the eighth inner surface 40*j* of the fourth groove portion 34*d*. The first biasing member 51 imparts a biasing force to the cam body 33 in a direction that causes the cam body 33 to rotate upward (counterclockwise in FIG. 17) about the second lateral shaft 32. The biasing force of the first biasing member 51 causes the first guide roller 36A to abut the eighth inner surface 40*j* (locked state). Under such conditions, when a portion other than the lever 31 (left operating lever 30, manipulator box 26 or the like) is depressed, the first guide roller 36A is engaged with the engagement portion 39*e* and the rotation of the movable body 26 about the first lateral shaft 27 is prevented. In this locked state, the first guide roller 36A cannot be disengaged from the eighth inner surface 40*j*, unless the operator operates the unloading lever 31 to rotate the cam body 33. This eliminates or reduces the likelihood that, when, for example, the operator depresses a portion other than the unloading lever 31 (left operating lever 30, manipulator box 26 or the like), the non-unloading state (loading state) will be entered against the operator's intention.

Operation of Left Manipulator when Unloading Lever is Depressed

Figure 16:
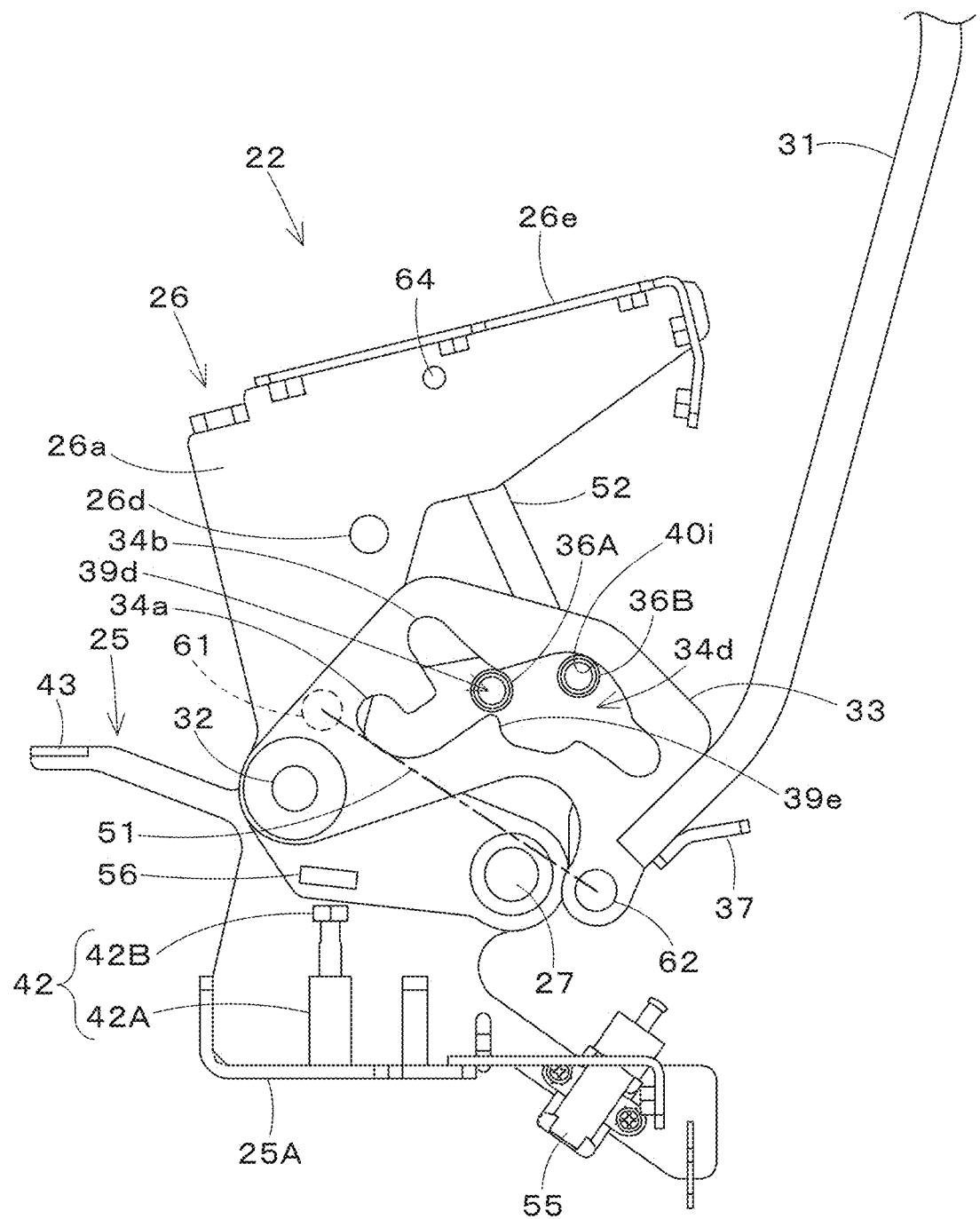
FIG. 16 is a right side view of a lever device with an unloading lever positioned at a point between the depressed position and the raised position that is closer to the raised position.

For the locked state as shown in FIG. 17 to be unlocked, the unloading lever 31 is slightly depressed against the biasing force of the first biasing member 51 and the second biasing member 52. With this, the cam body 33 rotates downward about the second lateral shaft 32. With this rotation, as shown in FIG. 16, the first guide roller 36A is disengaged from the eighth inner surface 40*j* and the locked state is unlocked. That is, pivoting the unloading lever 31 from the raised position toward the depressed position causes the first guide roller 36A to not abut the eighth inner surface 40*j* anymore. With this, the manipulator box 26 is allowed to rotate about the first lateral shaft 27. It is noted here that the first guide roller 36A is positioned in the communication portion 39*d*, and the second guide roller 36B abuts the seventh inner surface 40*i* of the fourth groove portion 34*d*.

Figure 15:
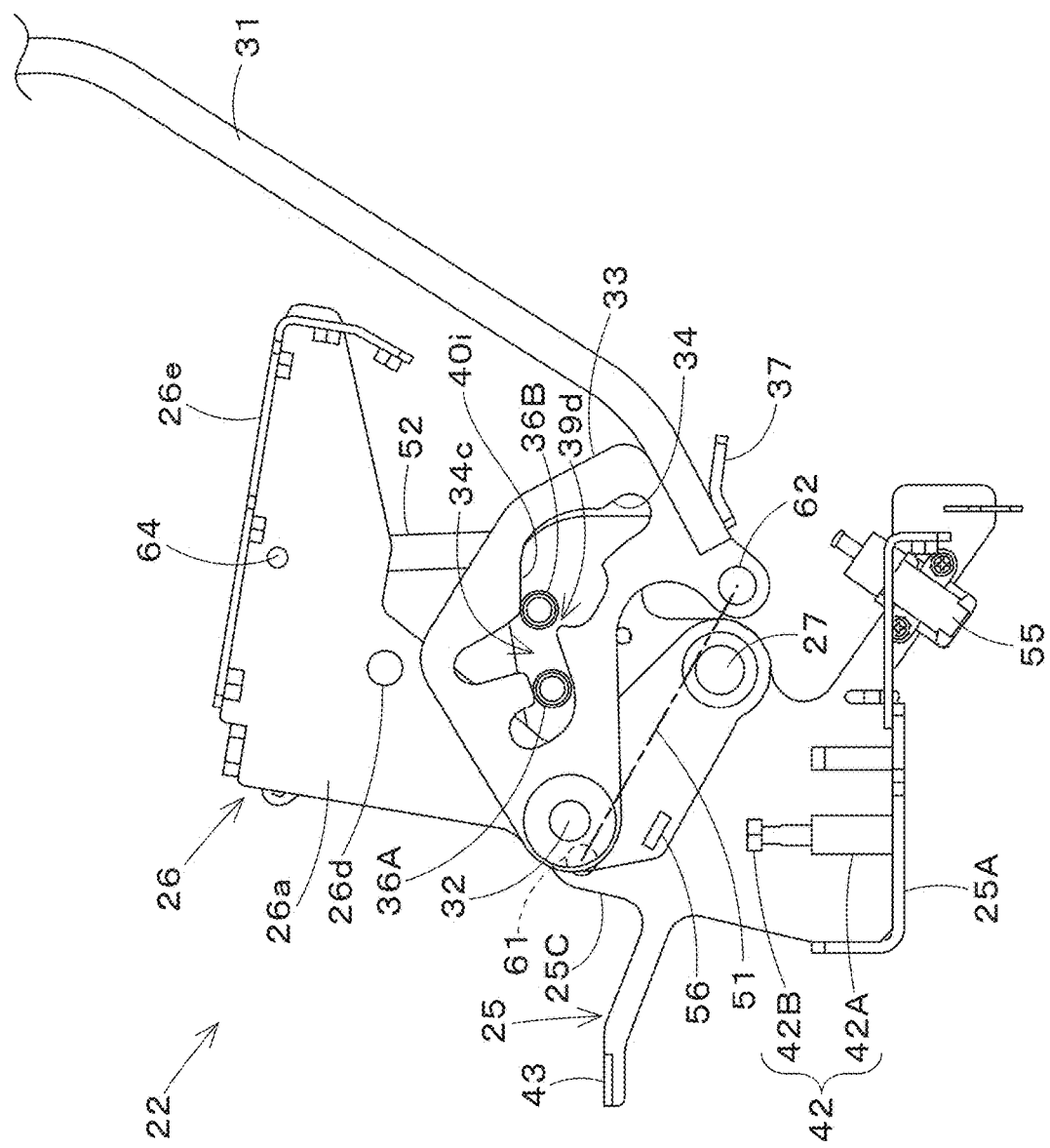
FIG. 15 is a right side view of a lever device with an unloading lever positioned at a point between the depressed position and the raised position that is closer to the depressed position.

After the locked state is unlocked, when the unloading lever 31 is depressed further against the biasing force of the first biasing member 51 and the second biasing member 52, the cam body 33 rotates downward (clockwise in FIG. 16) about the second lateral shaft 32. As the cam body 33 rotates, the first guide roller 36A and the second guide roller 36B move relative to the cam body 33, and move further within the cam groove 34. Specifically, as shown in FIG. 15, the first guide roller 36A enters from the communication portion 39*d* into the third groove portion 34*c* and moves rearward within the third groove portion 34*c*. The second guide roller 36B moves while abutting the seventh inner surface 40*i*, and moves to the communication portion 39*d*.

In the state shown in FIG. 15, the first biasing member 51 imparts a biasing force to the cam body 33 in a direction that causes the cam body 33 to rotate downward (clockwise in FIG. 15) about the second lateral shaft 32. That is, when the state shown in FIG. 16 transitions to the state shown in FIG. 15, the direction of the biasing force of the first biasing member 51 changes from the direction that causes the cam body 33 to rotate upward about the second lateral shaft 32 to the direction that causes the cam body 33 to rotate downward. With this, the first biasing member 51 assists in the operation to cause the manipulator box 26 to rotate downward about the first lateral shaft 27.

When the unloading lever 31 in the state shown in FIG. 15 is further depressed, the cam body 33 rotates further downward (clockwise in FIG. 15) about the second lateral shaft 32. As the cam body 33 rotates, the first guide roller 36A and the second guide roller 36B move relative to the cam body 33, and move further within the cam groove 34. Specifically, as shown in FIG. 14, the first guide roller 36A moves from the third groove portion 34*c* to the first groove portion 34*a*. The second guide roller 36B moves from the communication portion 39*d* via the third groove portion 34*c* to the second groove portion 34*b*. With this, the unloading lever 31 is brought into the depressed position, and the left manipulator 22 is brought into the use position.

Operation of Left Manipulator when Unloading Lever is Raised

When the unloading lever 31 in the depressed state as shown in FIG. 14 is raised against the biasing force of the first biasing member 51, the cam body 33 rotates upward (counterclockwise in FIG. 14) about the second lateral shaft 32. As the cam body 33 rotates, the first guide roller 36A and the second guide roller 36B move relative to the cam body 33 and move within the cam groove 34. Specifically, as shown in FIG. 15, the first guide roller 36A moves from the first groove portion 34*a* to the third groove portion 34*c*. The second guide roller 36B moves from the second groove portion 34*b* via the third groove portion 34*c* to the communication portion 39*d*.

When the unloading lever 31 in the state as shown in FIG. 15 is further raised, the cam body 33 rotates further upward about the second lateral shaft 32. As the cam body 33 rotates upward as such, the first guide roller 36A moves from the third groove portion 34c to the communication portion 39d. The second guide roller 36B moves from the communication portion 39d to the fourth groove portion 34d, and abuts the seventh inner surface 40i (see FIG. 16).

When the state shown in FIG. 15 transitions to the state shown in FIG. 16, the direction of the biasing force of the first biasing member 51 changes from the direction that causes the cam body 33 to rotate downward about the second lateral shaft 32 to the direction that causes the cam body 33 to rotate upward. With this, the first biasing member 51 assists in the operation to cause the manipulator box 26 to rotate upward about the first lateral shaft 27.

When the unloading lever 31 in the state as shown in FIG. 16 is further raised, the cam body 33 rotates further upward about the second lateral shaft 32. As the cam body 33 rotates upward as such, the first guide roller 36A moves from the communication portion 39d to the fourth groove portion 34d and abuts the eighth inner surface 40j. The second guide roller 36B moves from the fourth groove portion 34d to the fifth groove portion 34e. With this, as shown in FIG. 17, the unloading lever 31 is brought into the raised position, and the left manipulator 22 is brought into the upward pivoted position (retracted position).

A lever device (left manipulator 22) according to example embodiments as described so far includes a base 25, a movable body 26 pivotally supported on the base 25 rotatably about a first lateral shaft 27, a lever 31 supported by the movable body 26 and pivotable between a depressed position and a raised position, a cam body 33 including a cam groove 34, the cam body 33 being pivotally supported on the movable body 26 rotatably about a second lateral shaft 32 and configured to rotate about the second lateral shaft 32 as the lever 31 is pivoted, guide members 36 attached to the base 25 and inserted in the cam groove 34, the guide members 36 being configured to change a position thereof relative to the cam groove 34 as the lever 31 is pivoted, wherein the guide members 36 include a first guide member 36A and a second guide member 36B, and the cam groove 34 includes a first groove portion 34a in which the first guide member 63A is positioned when the lever 31 is in the depressed position, and a second groove portion 34b in which the second guide member 36B is positioned when the lever 31 is in the depressed position.

With this configuration, when the lever 31 is in the depressed position, the first guide member 36A is positioned in the first groove portion 34a and the second guide member 36B is positioned in the second groove portion 34b, and therefore the cam body 33 including the cam groove 34 is positioned in place by the guide members 36 (first guide member 36A and second guide member 36B) at two points. Thus, it is possible to, at two points, position the cam body 33 (which rotates as the lever 31 is pivoted) in place relative to the base 25 having the guide members 36 attached thereto. With this, it is possible to eliminate or reduce the likelihood that rattling (rattling of the lever 31 relative to the base 25) will occur when some other lever (left operating lever 30) is operated with the lever 31 in the depressed position.

The cam body 33 includes a projecting portion 39a projecting toward an interior of the cam groove 34 to separate the first groove portion 34a and the second groove portion 34b. The projecting portion 39a is positioned between the first guide member 36A and the second guide member 36B when the lever 31 is in the depressed position.

With this configuration, since the projecting portion 39a is positioned between the first guide member 36A and the second guide member 36B, it is possible to achieve positioning with the projecting portion 39a of the cam body 33 held between the first guide member 36A and the second guide member 36B. Thus, it is possible to more reliably eliminate or reduce the likelihood that rattling will occur when some other lever (left operating lever 30) is operated with the lever 31 in the depressed position.

The first groove portion 34a and the second groove portion 34b are each configured such that a bottom thereof is positioned up and an opening thereof faces downward when the lever 31 is in the depressed position, and the projecting portion 39a projects downward when the lever 31 is in the depressed position.

This configuration makes it easier, when the lever 31 is pivoted from the raised position to the depressed position, to allow the first guide member 36A to be inserted into the first groove portion 34a and to allow the second guide member 36B to be inserted into the second groove portion 34b.

The cam groove 34 includes a fourth groove portion 34d where the first guide member 36A is positioned when the lever 31 is in the raised position, a fifth groove portion 34e where the second guide member 36B is positioned when the lever 31 is in the raised position, and a third groove portion 34c in communication with the first groove portion 34a, the second groove portion 34b, the fourth groove portion 34d and the fifth groove portion 34e. The first guide member 36A and the second guide member 36B are configured to move through the third groove portion 34c when the lever 31 is pivoted between the depressed position and the raised position.

With this configuration, it is possible to reduce the length of the cam groove 34 as compared to the configuration in which, when the lever 31 is pivoted between the depressed position and the raised position, the first guide member 36A and the second guide member 36B move through different groove portions. With this, it is possible to reduce the size of the cam body 33, and possible to reduce the size of the lever device 22.

The first groove portion 34a includes a first inner surface 40a located on the same side of the first groove portion 34a as the second groove portion 34b, and a second inner surface 40b located on the opposite side of the first groove portion 34a from the second groove portion 34b. The second groove portion 34b includes a third inner surface 40d located on the same side of the second groove portion 34b as the first groove portion 34a, and a fourth inner surface 40e located on the opposite side of the second groove portion 34b from the first groove portion 34a. The first guide member 36A is configured to abut the first inner surface 40a and be separate from the second inner surface 40b when the first guide member 36A is positioned in the first groove portion 34a. The second guide member 36B is configured to abut the third inner surface 40d and be separate from the fourth inner surface 40e when the second guide member 36B is positioned in the second groove portion 34b.

With this configuration, since the first guide roller 36A abuts the first inner surface 40a of the first groove portion 34a and the second guide roller 36B abuts the third inner surface 40d of the second groove portion 34b, it is possible to prevent or reduce rattling that would occur when the left operating lever 30 is operated. Furthermore, since the first guide roller 36A is separate from the second inner surface 40b of the first groove portion 34a and the second guide roller 36B is separate from the fourth inner surface 40e of the second groove portion 34b, the first guide roller 36A moves smoothly within the first groove portion 34a and the second guide roller 36B moves smoothly within the second groove portion 34b.

The first inner surface 40a is in the shape of an arc centered on an axis of the second lateral shaft 32.

This configuration makes it possible, when the lever 31 is depressed to cause the cam body 33 to rotate about the second lateral shaft 32, to allow the first guide member 36A to move smoothly along the first inner surface 40a of the first groove portion 34a.

The third inner surface 40d is linear and is configured such that, when the lever 31 is in the depressed position, an axis of the first lateral shaft 27 is positioned on an extension L2 of the third inner surface 40d.

With this configuration, it is possible to more reliably prevent or reduce rattling that would occur when some other lever (left operating lever 30) is operated with the lever 31 in the depressed position.

The guide members 36 include guide rollers 36 each rotatable about an axis parallel to the second lateral shaft 32. The guide rollers 36 include a first guide roller 36A defining the first guide member 36A, and a second guide roller 36B defining the second guide member 36B.

With this configuration, the first guide roller 36A and the second guide roller 36B rotate within the cam groove 34 and therefore smoothly move within the cam groove 34.

The lever device 22 further includes a first biasing member 51 to bias the cam body 33 in a direction that causes the cam body 33 to rotate about the second lateral shaft 32. The cam groove 34 includes an inner surface (eighth inner surface) 40j to be abutted by the first guide member 36a when the lever 31 is in the raised position. The first biasing member 51 is configured to impart a biasing force to cause the first guide member 36A to abut the inner surface (eighth inner surface) 40j when the lever 31 is in the raised position. The cam groove 34 includes an engagement portion 39e to engage with the first guide member 36A when a portion other than the lever 31 (e.g., left operating lever 30, manipulator box 26, etc.) is depressed when the lever 31 is in the raised position.

With this configuration, when the lever 31 is in the raised position, the first guide roller 36A is brought into the state (locked state) in which the first guide roller 36A abuts the eighth inner surface 40j by the biasing force of the first biasing member 51. When a portion other than the lever 31 (such a portion is, for example, the left operating lever 30, manipulator box 26 or the like) is depressed in such a condition, the first guide roller 36A is engaged with the engagement portion 39e. With this, it is possible to eliminate or reduce the likelihood that, when the operator depresses a portion other than the lever (unloading lever 31) (such a portion is, for example, the left operating lever 30, manipulator box 26 or the like), the movable body 26 will swing downward from the raised position.

The cam body 33 includes an inwardly projecting portion 39c to project upward toward an interior of the cam groove 34 when the lever (unloading lever 31) is in the raised position. The engagement portion 39e includes a portion of a surface of the inwardly projecting portion 39c. When the engagement portion 39e and the first guide roller 36A abut each other, an axis of the first lateral shaft 27 is positioned on a tangent L3 to an outer surface of the first guide roller 36A that passes through the engagement portion 39e.

With this configuration, it is possible to reliably cause the first guide member 36A to abut a portion 39e of the surface of the inwardly projecting portion 39c when a portion other than the lever (unloading lever 31) (such a portion is, for example, the left operating lever 30, manipulator box 26 or the like) is depressed with the lever (unloading lever 31) in the raised position, making it possible to cause the first guide member 36A to reliably engage with the engagement portion 39e.

The lever device 22 is configured such that pivoting of the lever 31 from the raised position to the depressed position allows the first guide member 36A to be disengaged from the engagement portion 39e (allows the first guide member 36A to not abut the engagement portion 39e anymore) and allows the movable body 26 to rotate about the first lateral shaft 27.

This configuration makes it possible, when the operator depresses a portion other than the lever (unloading lever 31) (such a portion is, for example, the left operating lever 30, manipulator box 26 or the like) with the lever 31 in the raised position, to eliminate or reduce the likelihood that the lever 31 will be pivoted downward from the raised position.

A working machine according to example embodiments described so far includes the foregoing lever device (left manipulator 22).

This configuration makes it possible to achieve a working machine 1 including a lever device 22 which makes it possible to prevent or reduce rattling that would occur when some other lever (left operating lever 30) is operated with the lever 31 in the depressed position.

The working machine 1 includes an operator's seat 8, a hydraulic actuator, and a lever device 22 provided at one side of the operator's seat 8. The lever 31 includes an unloading lever to switch the hydraulic actuator between an operable state and a non-operable state.

This configuration makes it possible to achieve a working machine 1 including an unloading lever device which makes it possible to prevent or reduce rattling that would occur when some other lever (left operating lever 30) is operated with the lever 31 in the depressed position.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A lever device comprising:
a base;
a movable body pivotally supported on the base rotatably about a first lateral shaft;
a lever supported by the movable body and pivotable between a depressed position and a raised position;
a cam body including a cam groove, the cam body being pivotally supported on the movable body rotatably about a second lateral shaft and configured to rotate about the second lateral shaft as the lever is pivoted; and
guide members attached to the base and inserted in the cam groove, the guide members being configured to change a position thereof relative to the cam groove as the lever is pivoted; wherein
the guide members include a first guide member and a second guide member; and
the cam groove includes a first groove portion in which the first guide member is positioned when the lever is in the depressed position, and a second groove portion in which the second guide member is positioned when the lever is in the depressed position.
2. The lever device according to claim 1, wherein
the cam body includes a projecting portion projecting toward an interior of the cam groove to separate the first groove portion and the second groove portion; and the projecting portion is positioned between the first guide member and the second guide member when the lever is in the depressed position.

3. The lever device according to claim 2, wherein
the first groove portion and the second groove portion are each configured such that a bottom thereof is positioned up and an opening thereof faces downward when the lever is in the depressed position, and the projecting portion projects downward when the lever is in the depressed position.

4. The lever device according to claim 1, wherein
the cam groove includes a fourth groove portion where the first guide member is positioned when the lever is in the raised position, a fifth groove portion where the second guide member is positioned when the lever is in the raised position, and a third groove portion in communication with the first groove portion, the second groove portion, the fourth groove portion and the fifth groove portion; and
the first guide member and the second guide member are configured to move through the third groove portion when the lever is pivoted between the depressed position and the raised position.

5. The lever device according to claim 1, wherein
the first groove portion includes a first inner surface located on the same side of the first groove portion as the second groove portion, and a second inner surface located on the opposite side of the first groove portion from the second groove portion;
the second groove portion includes a third inner surface located on the same side of the second groove portion as the first groove portion, and a fourth inner surface located on the opposite side of the second groove portion from the first groove portion;
the first guide member is configured to abut the first inner surface and be separate from the second inner surface when the first guide member is positioned in the first groove portion; and
the second guide member is configured to abut the third inner surface and be separate from the fourth inner surface when the second guide member is positioned in the second groove portion.

6. The lever device according to claim 5, wherein
the first inner surface is in the shape of an arc centered on an axis of the second lateral shaft.

7. The lever device according to claim 5, wherein
the third inner surface is linear and is configured such that, when the lever is in the depressed position, an axis of the first lateral shaft is positioned on an extension of the third inner surface.

8. The lever device according to claim 1, wherein
the guide members include guide rollers each rotatable about an axis parallel to the second lateral shaft; and
the guide rollers include a first guide roller defining the first guide member, and a second guide roller defining the second guide member.

9. The lever device according to claim 1, further comprising:
a first biasing member to bias the cam body in a direction that causes the cam body to rotate about the second lateral shaft; wherein
the cam groove includes an inner surface to be abutted by the first guide member when the lever is in the raised position; and
the first biasing member is configured to impart a biasing force to cause the first guide member to abut the inner surface when the lever is in the raised position.

10. The lever device according to claim 1, wherein
the cam groove includes an engagement portion to engage with the first guide member when a portion other than the lever is depressed when the lever is in the raised position.

11. The lever device according to claim 10, wherein
the lever device is configured such that pivoting of the lever from the raised position to the depressed position allows the first guide member to be disengaged from the engagement portion and allows the movable body to rotate about the first lateral shaft.

12. The lever device according to claim 1, wherein
the guide members include guide rollers each rotatable about an axis parallel to the second lateral shaft;
the guide rollers include a first guide roller defining the first guide member, and a second guide roller defining the second guide member; and
the cam groove includes an engagement portion to engage with the first guide member when a portion other than the lever is depressed when the lever is in the raised position.

13. The lever device according to claim 12, wherein
the cam body includes an inwardly projecting portion to project upward toward an interior of the cam groove when the lever is in the raised position;
the engagement portion includes a portion of a surface of the inwardly projecting portion; and
when the engagement portion and the first guide roller abut each other, an axis of the first lateral shaft is positioned on a tangent to an outer surface of the first guide roller that passes through the engagement portion.

14. A working machine comprising the lever device according to claim 1.

15. The working machine according to claim 14, comprising:
an operator's seat;
a hydraulic actuator; and
the lever device provided at one side of the operator's seat; wherein
the lever includes an unloading lever to switch the hydraulic actuator between an operable state and a non-operable state.

* * * * *